US012641159B2

(12) United States Patent
Sha et al.

(10) Patent No.: US 12,641,159 B2
(45) Date of Patent: May 26, 2026

(54) METHOD FOR PROCESSING A SESSION MESSAGE AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Sha Sha, Shenzhen (CN); Liqiang Liu, Shenzhen (CN); Shiyu Chen, Shenzhen (CN); Longwu Jiang, Shenzhen (CN); Yulin Shen, Shenzhen (CN); Xianmin Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/594,111

(22) Filed: Mar. 4, 2024

(65) Prior Publication Data

US 2024/0205298 A1     Jun. 20, 2024

Related U.S. Application Data

(63) Continuation of application No. PCT/CN2023/083661, filed on Mar. 24, 2023.

(30) Foreign Application Priority Data

Jul. 25, 2022     (CN) .......................... 202210889534.9

(51) Int. Cl.
| | |
|---|---|
| *G06F 15/173* | (2006.01) |
| *H04L 51/04* | (2022.01) |
| *H04L 67/148* | (2022.01) |

(52) U.S. Cl.
CPC ............ *H04L 67/148* (2013.01); *H04L 51/04* (2013.01)

(58) Field of Classification Search
CPC ..... H04L 67/148; H04L 51/04; H04L 51/216; H04L 51/043; H04L 51/046; H04L 51/226
See application file for complete search history.

(56) References Cited

U.S. PATENT DOCUMENTS

| | | | | |
|---|---|---|---|---|
| 9,485,348 | B2 * | 11/2016 | Jeong ................ | H04M 1/72436 |
| 2014/0136989 | A1 | 5/2014 | Choi | |
| 2023/0403245 | A1 * | 12/2023 | Chen ................... | G06F 3/04812 |

FOREIGN PATENT DOCUMENTS

| | | |
|---|---|---|
| CN | 111327518 A | 6/2020 |
| CN | 113360238 A | 9/2021 |

(Continued)

OTHER PUBLICATIONS

International Search Report for PCT/CN2023/083661 dated Jun. 14, 2023.
Written Opinion for PCT/CN2023/083661 dated Jun. 14, 2023.

*Primary Examiner* — John B Walsh
(74) *Attorney, Agent, or Firm* — Sughrue Mion, PLLC

(57) ABSTRACT

A method for processing a session message and apparatus, a device, a storage medium, and a program product. The method includes displaying at least two session messages, the at least two session messages comprising a first session message and a second session message, receiving a message merging instruction, the message merging instruction being configured to instruct merging the first session message and the second session message and displaying, based on the message merging instruction, a third session message obtained by merging the first session message and the second session message.

20 Claims, 23 Drawing Sheets

(56) References Cited

FOREIGN PATENT DOCUMENTS

| CN | 113918055 | A | 1/2022 |
| CN | 114422468 | A | 4/2022 |

* cited by examiner

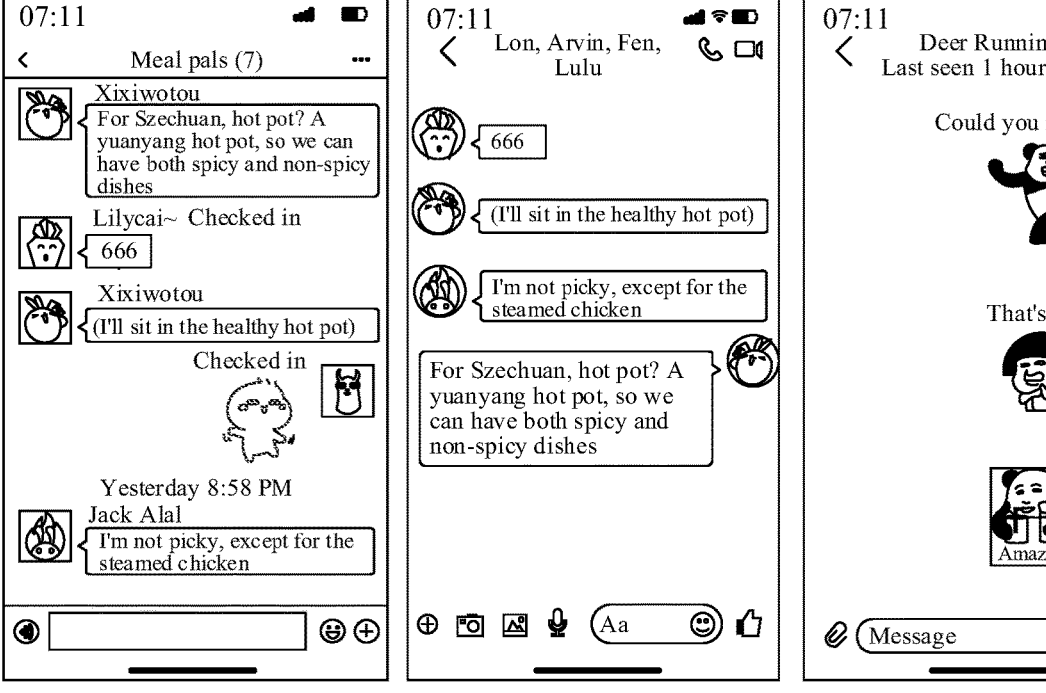
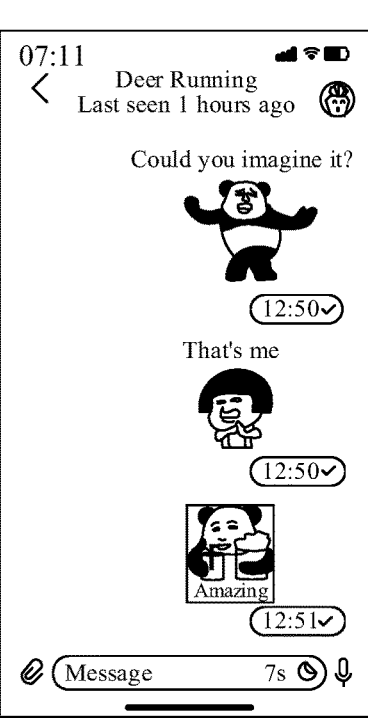
FIG. 1

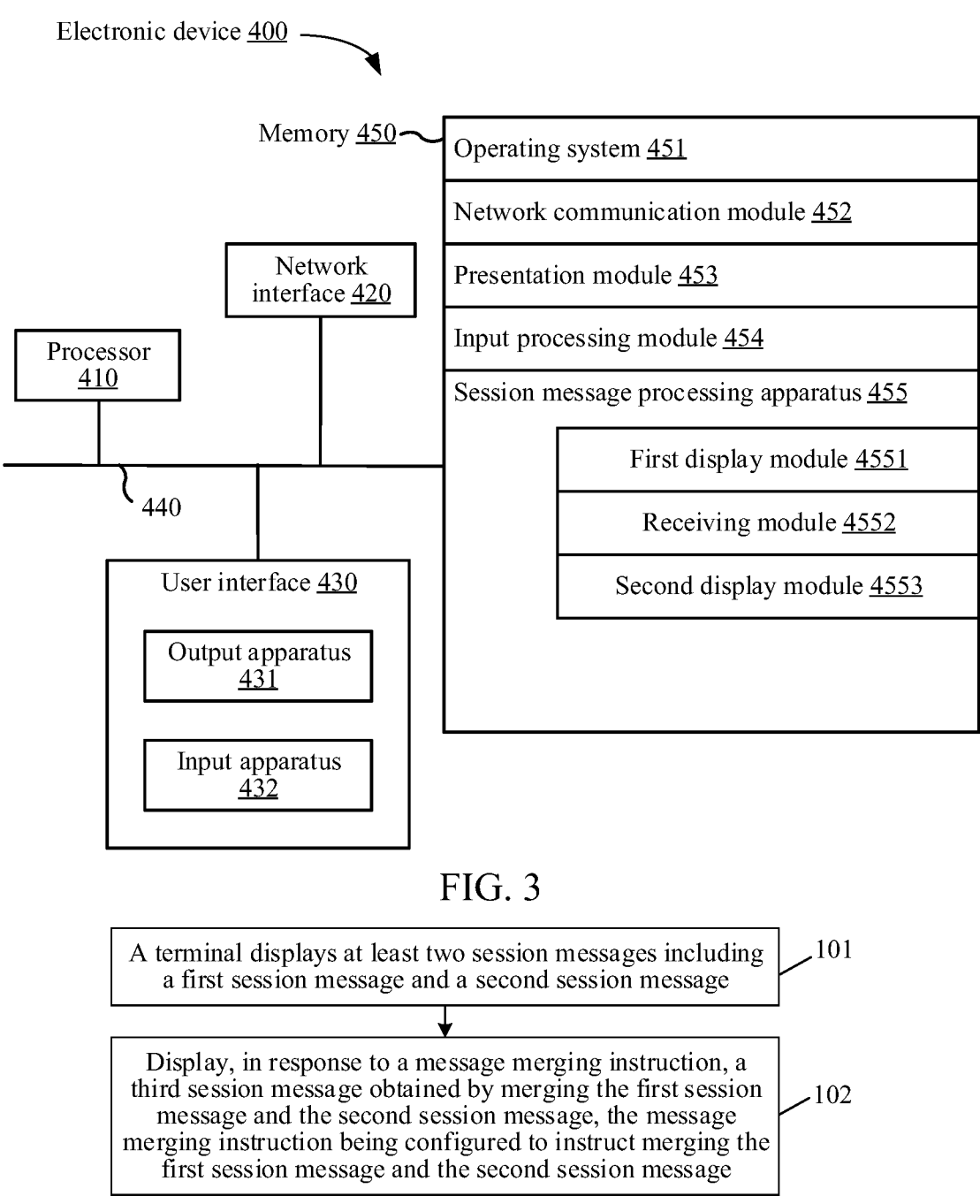

Electronic device 400

Memory 450

Operating system 451

Network communication module 452

Presentation module 453

Input processing module 454

Session message processing apparatus 455

First display module 4551

Receiving module 4552

Second display module 4553

Network interface 420

Processor 410

440

User interface 430

Output apparatus 431

Input apparatus 432

FIG. 3

A terminal displays at least two session messages including a first session message and a second session message    101

Display, in response to a message merging instruction, a third session message obtained by merging the first session message and the second session message, the message merging instruction being configured to instruct merging the first session message and the second session message    102

A time sequence may be adjusted within a specific time range

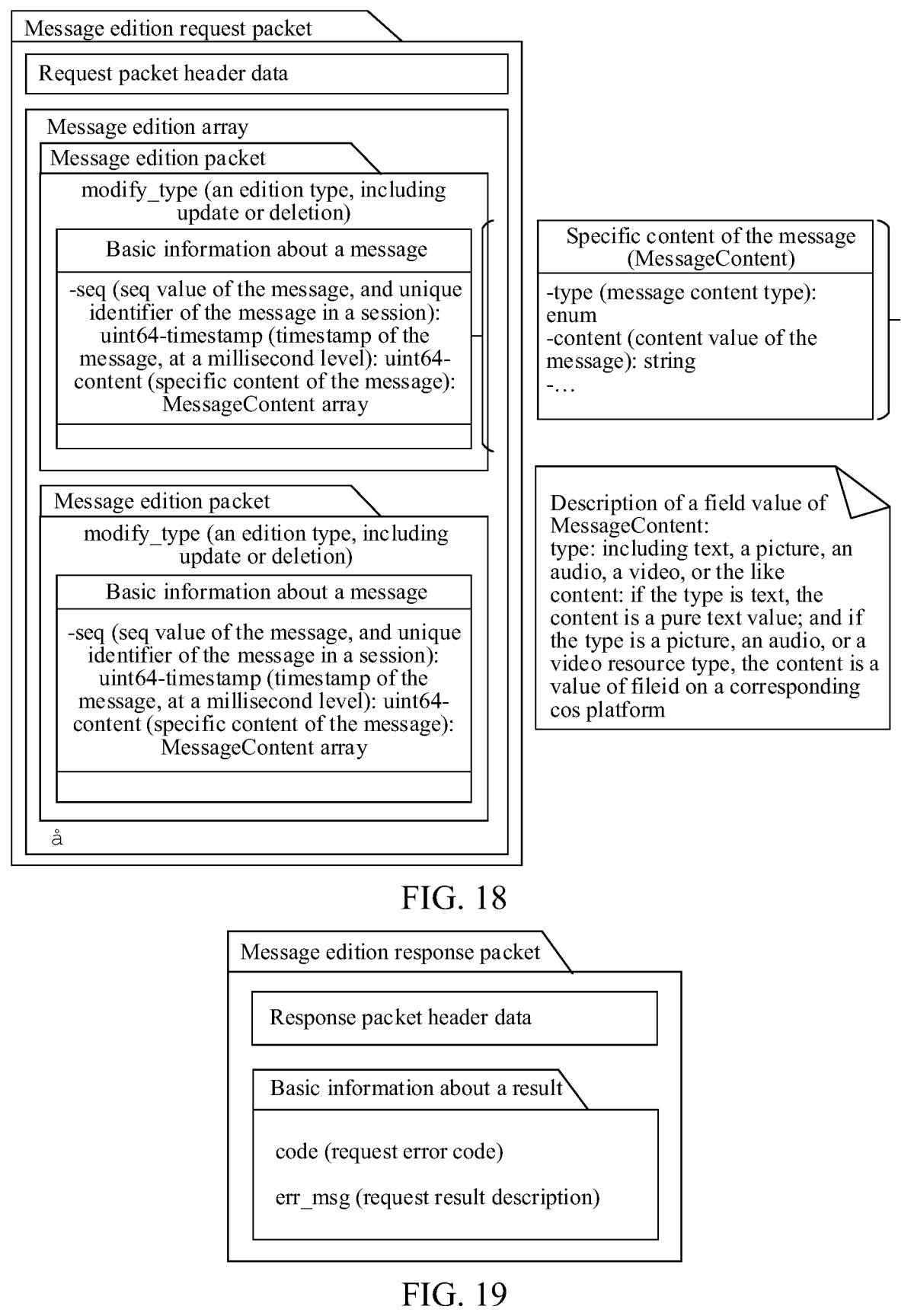

Message edition request packet

Request packet header data

Message edition array

Message edition packet modify_type (an edition type, including update or deletion)

Basic information about a message

-seq (seq value of the message, and unique identifier of the message in a session): uint64-timestamp (timestamp of the message, at a millisecond level): uint64-content (specific content of the message): MessageContent array Specific content of the message (MessageContent)

-type (message content type): enum
-content (content value of the message): string
-...

Message edition packet modify_type (an edition type, including update or deletion)

Basic information about a message

-seq (seq value of the message, and unique identifier of the message in a session): uint64-timestamp (timestamp of the message, at a millisecond level): uint64-content (specific content of the message): MessageContent array Description of a field value of MessageContent:
type: including text, a picture, an audio, a video, or the like
content: if the type is text, the content is a pure text value; and if the type is a picture, an audio, or a video resource type, the content is a value of fileid on a corresponding cos platform

Message edition response packet

Response packet header data

Basic information about a result code (request error code)

err_msg (request result description)

FIG. 19

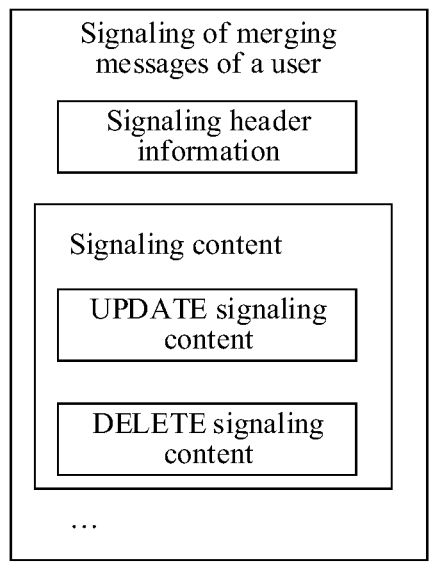
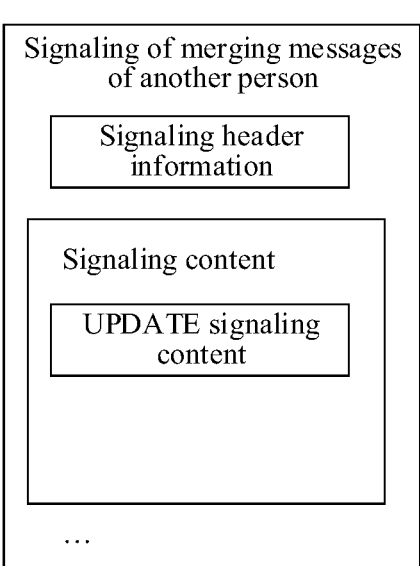
FIG. 24
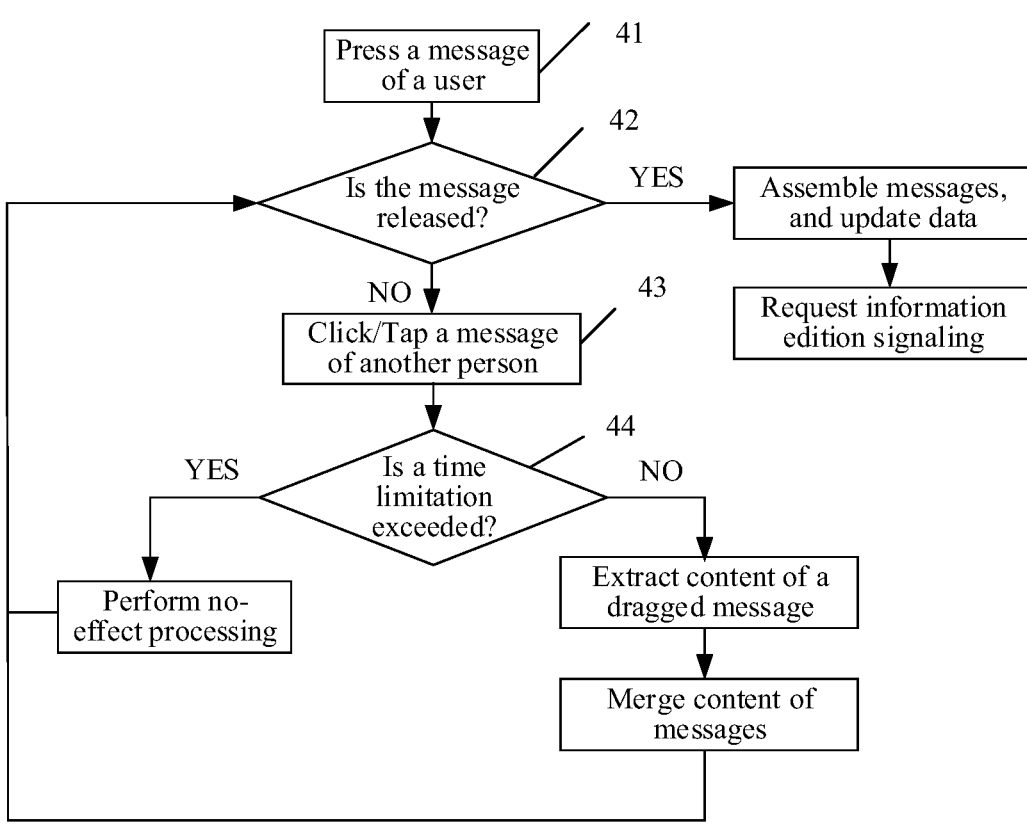
FIG. 25

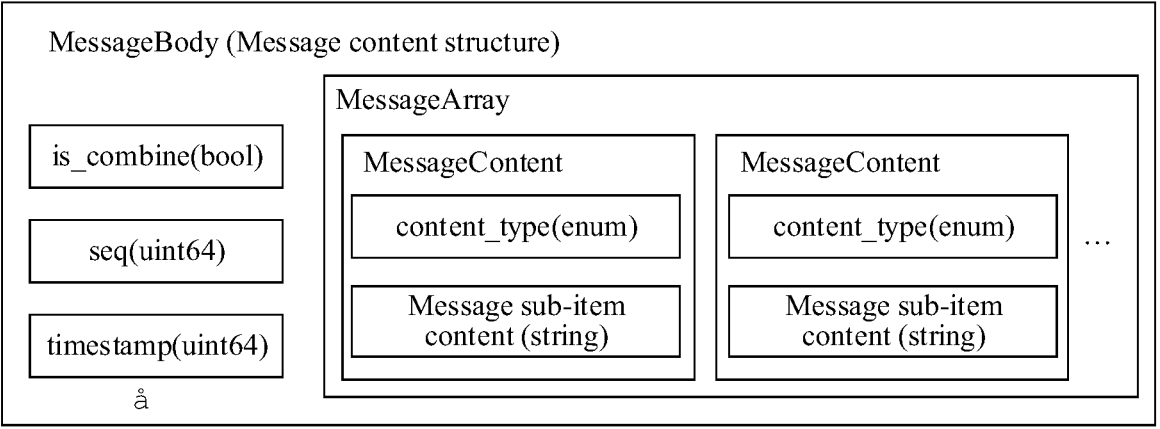

FIG. 26

```
┌─────────────────────────┐
│   Click/Tap a message   │
│    of a merging type    │
└─────────────────────────┘
            │
            ▼
┌─────────────────────────┐
│   Pop up an operation   │
│     selection frame     │
└─────────────────────────┘
```

| Click/Tap "Send" | Click/Tap "Forward" | Click/Tap "Copy" | Click/Tap "Vote" |
|---|---|---|---|
| Invoke the message for sending | Invoke the message for forwarding | Invoke the message for copying | Parse content of the message |

```
                                              │
                                              ▼
                                    ┌──────────────────┐
                                    │   Divide into    │
                                    │   options of     │
                                    │     voting       │
                                    └──────────────────┘
                                              │
                                              ▼
                                    ┌──────────────────┐
                                    │  Invoke a vote   │
                                    │    interface     │
                                    └──────────────────┘
```

FIG. 27

METHOD FOR PROCESSING A SESSION MESSAGE AND APPARATUS, DEVICE, STORAGE MEDIUM, AND PROGRAM PRODUCT

CROSS-REFERENCE RELATED APPLICATIONS

This application is a continuation application of International Application No. PCT/CN2023/083661 filed on Mar. 24, 2023, which claims priority to Chinese Patent Application No. 202210889534.9, filed with the China National Intellectual Property Administration on Jul. 25, 2022, the disclosures of each being incorporated by reference herein in their entireties.

FIELD

The disclosure relates to the field of artificial intelligence and Internet technologies, and in particular, to a method and an apparatus for processing a session message, a device, a storage medium, and a program product.

BACKGROUND

Artificial intelligence (AI) is a comprehensive technology in computer science. AI attempts to understand the essence of intelligence and produce a new type of intelligent machine that can react in a similar way to human intelligence, and has been increasingly used in the fields such as instant messaging as AI technology continues to develop.

In the related art, during a session of a user based on a session interface, session messages are sorted in the session interface according to a transmitting time, consecutive messages transmitted by the user may be interrupted by a message of another person, and communication efficiency of messages is low. When it is necessary to perform an operation (for example, summarization) on messages transmitted by a user that are dispersedly displayed, an operation needs to be performed on the messages one by one, resulting in low operation efficiency for the messages.

SUMMARY

Some embodiments provide a method and an apparatus for processing a session message, an electronic device, a computer-readable storage medium, and a computer program product, capable of implementing message merging during a session and improving communication efficiency of messages and operation efficiency for a plurality of messages.

Some embodiments provide a method for processing a session message, including: displaying at least two session messages, the at least two session messages including a first session message and a second session message; receiving a message merging instruction, the message merging instruction being configured to instruct merging the first session message and the second session message; and displaying, based on the message merging instruction, a third session message obtained by merging the first session message and the second session message.

Some embodiments provide an apparatus for processing a session message, including: at least one memory configured to store program code; and at least one processor configured to read the program code and operate as instructed by the program code, the program code comprising: first display code configured to cause at least one of the at least one processor to display at least two session messages, the at least two session messages including a first session message and a second session message; receiving code configured to cause at least one of the at least one processor to receive a message merging instruction, the message merging instruction being configured to instruct merging the first session message and the second session message; and second display code configured to cause at least one of the at least one processor to display, based on the message merging instruction, a third session message obtained by merging the first session message and the second session message.

Some embodiments provide a non-transitory computer-readable storage medium storing computer code which, when executed by at least one processor, causes the at least one processor to at least: display at least two session messages, the at least two session messages comprising a first session message and a second session message; receive a message merging instruction, the message merging instruction being configured to instruct merging the first session message and the second session message; and display, based on the message merging instruction, a third session message obtained by merging the first session message and the second session message.

In a case that the message merging instruction indicating merging the first session message and the second session message is triggered, the third session message obtained by merging the first session message and the second session message are displayed. In this way, because the message merging instruction indicates merging the first session message and the second session message, that is, specifying merging the first session message and the second session message, the electronic device can merge, in response to the message merging instruction, specified first session message and second session message, improving the communication efficiency of the messages. Moreover, because the independent first session message and second session message are merged into the third session message, when it is necessary to perform an operation on the first session message and the second session message, the operation may be directly performed on the third session message obtained through merging, improving the operation efficiency for a plurality of session messages. In addition, compared with a solution in the related art in which a message is presented in a session interface only according to a transmitting time of the message, utilization of hardware processing resources and display resources of the electronic device is improved.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 1 is a schematic diagram of an interface in which a message session is performed in the related art;

FIG. 3 is a schematic structural diagram of an electronic device according to some embodiments;

FIG. 4 is a schematic flowchart of a method for processing a session message according to some embodiments;

FIG. 18 is a schematic composition diagram of a protocol request packet according to some embodiments;

FIG. 19 is a schematic composition diagram of a response packet according to some embodiments;

FIG. 24 is a schematic diagram of message signaling comparison according to some embodiments;

FIG. 25 is a schematic flowchart of preprocessing of merging messages of another person according to some embodiments;

FIG. 26 is a schematic structural diagram of message content according to some embodiments; and FIG. 27 is a schematic flowchart of processing after messages are merged according to some embodiments.

DESCRIPTION OF EMBODIMENTS

Figure 2:
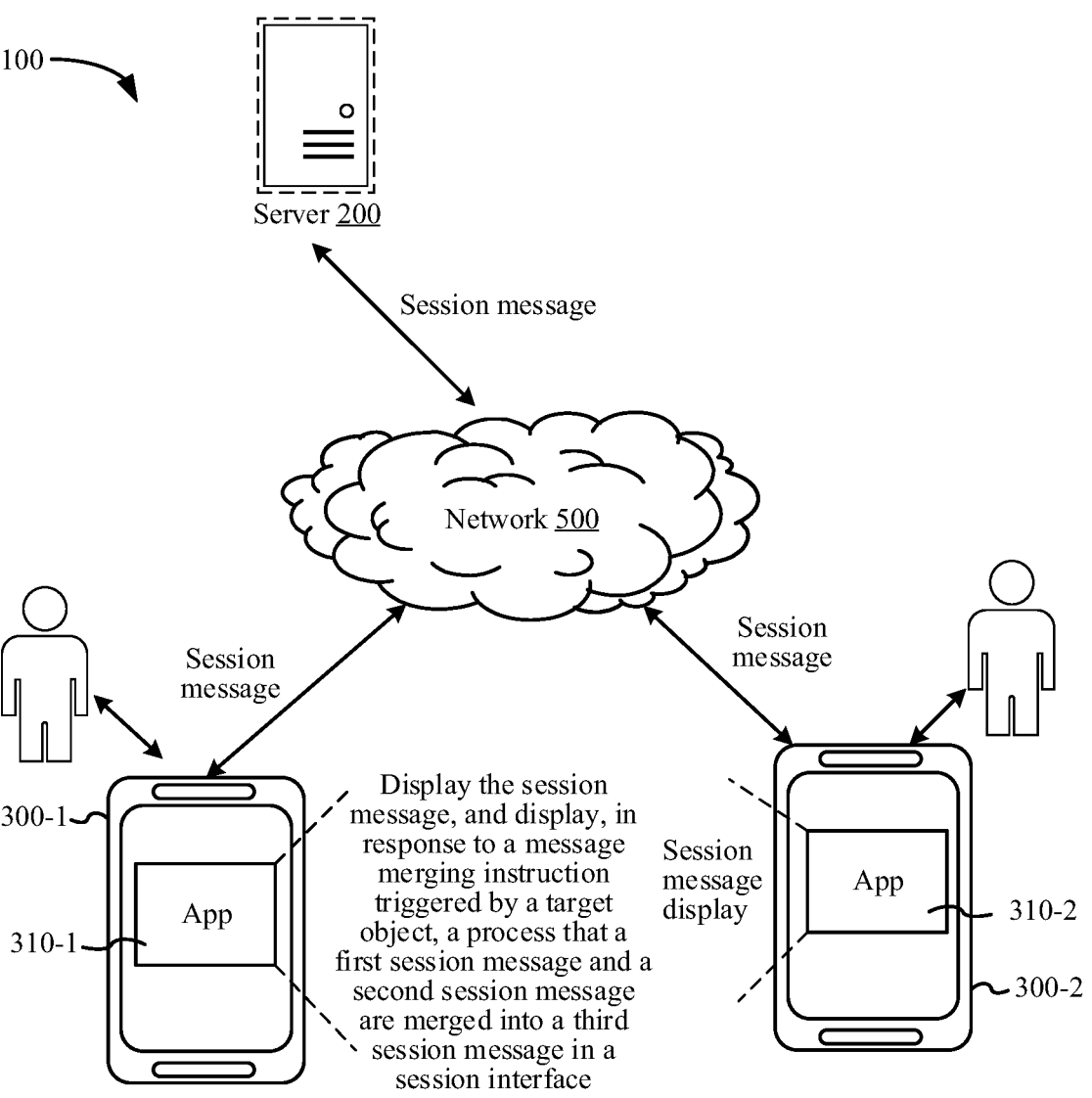
FIG. 2 is a schematic architectural diagram of a system 100 for processing a session message according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C.".

In the following descriptions, related term "first/second/third" is merely intended to distinguish similar objects but does not necessarily indicate a specific order of an object. It may be understood that the "first/second/third" is interchangeable in terms of a specific order or sequence if permitted, so that the embodiments described herein can be implemented in a sequence in addition to the sequence shown or described herein.

Unless otherwise defined, meanings of all technical and scientific terms used in this specification are the same as those usually understood by a person skilled in the art to which the disclosure belongs. Terms used herein are merely intended to describe objectives of various embodiments, but are not intended to limit.

Before embodiments are further described in detail, relevant terms are described. The relevant terms are applicable to the following explanations.

(1) "In response to" is used for representing a condition or status on which a to-be-performed operation depends. When the condition or status is satisfied, one or more to-be-performed operations may be real-time or have a set delay. Unless otherwise specified, there is no chronological order between a plurality of to-be-performed operations.

(2) "Client" is an application run in a terminal configured to provide various services, and refers to an instant messaging client or a client with a session function in this specification, such as a video playback client, a game client, and an education client.

FIG. 1 is a schematic diagram of an interface in which a message session is performed in the related art. Referring to FIG. 1, in the related art, messages are displayed in a sequence of transmitting times of the messages in a session interface, and consecutive messages to be transmitted may be interrupted by a message of another person. For a group chat session, when content of discussion of a plurality of people in the group needs to be summarized, the message can only be copied one by one and then summarized, so that message processing efficiency is low.

A system for processing a session message according to some embodiments is described below. FIG. 2 is a schematic architectural diagram of a system 100 for processing a session message according to some embodiments. In some embodiments, a terminal (for example, a terminal 300-1 and a terminal 300-2 are shown, where a client 310-1 is installed in the terminal 300-1, and a client 310-2 is installed in the terminal 300-2) is connected to a server 200 through a network 500. The network 500 may be a wide area network or a local area network, or a combination thereof, and implements data transmission by using a wireless or wired link.

In a scenario of performing a message session, an example in which a terminal of a target object is the terminal 300-1, and a terminal of a session object of the target object is the terminal 300-2 is used for description. During practical implementation, a number of session objects of the target object (a number of the terminals 300-2) may be one or more (that is, at least two).

The server 200 is configured to distribute a message transmitted by each member (the target object or the session object of the target object) in a session to each member in the session.

The terminal 300-1 and the terminal 300-2 are configured to display the message in the session interface after receiving the message distributed by the server.

The terminal 300-1 is further configured to display, in a case that session messages displayed in a session interface are at least two session messages including a first session message and the second session message, in response to a message merging instruction triggered by the target object, the message merging instruction being configured to instruct merging the first session message and the second session message, a third session message obtained by merging the first session message and the second session message in the session interface In some embodiments, a client, for example, an instant messaging client, is installed in the terminal 300-1. The terminal executes the instant messaging client, so that the target object can perform a message session based on a session interface displayed in the instant messaging client. In some embodiments, when the target object performs a message session based on the session interface, at least two session messages including the first session message and the second session message are displayed in the session interface. The instant messaging client displays, in response to the message merging instruction triggered by the target object, in a case that the message merging instruction is configured to instruct merging the first session message and the second session message, the third session message obtained by merging the first session message and the second session message in the session interface.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal (for example, the terminal 300-1) may be a smartphone, a tablet computer, a notebook computer, a desktop computer, a smart home appliance (for example, a smart speaker and a smart television), a smart watch, a smart voice interaction device, an in-vehicle terminal, an aerial vehicle, or the like, but is not limited thereto. The terminal (for example, the terminal 300-1) and the server 200 may be directly or indirectly connected in a wired or wireless communication manner. This is not limited herein.

A hardware structure of an electronic device of the method for processing a session message according to some embodiments is described in detail below. The electronic device includes, but is not limited to, the server or the terminal. For example, the electronic device may be the terminal (including the terminal 300-1 and the terminal 300-2) in FIG. 2. FIG. 3 is a schematic structural diagram of an electronic device according to some embodiments. An electronic device 400 shown in FIG. 3 includes: at least one processor 410, a memory 450, at least one network interface 420, and a user interface 430. All the components in the electronic device 400 are coupled together by using a bus system 440. It may be understood that the bus system 440 is configured to implement connection and communication between the components. In addition to a data bus, the bus system 440 further includes a power bus, a control bus, and a state signal bus. However, for ease of clear description, all types of buses in FIG. 3 are marked as the bus system 440.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and another input button and control.

The memory 450 may be a removable memory, a non-removable memory, or a combination thereof. Exemplary hardware devices include a solid-state memory, a hard disk drive, an optical disc driver, or the like. In some embodiments, the memory 450 includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in some embodiments is to include any suitable type of memories.

In some embodiments, the memory 450 can store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A presentation module 453 is configured to present information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, an apparatus for processing a session message may be implemented in a form of software. FIG. 3 shows an apparatus 455 that is for processing a session message and that is stored in the memory 450, which may be software in a form of a program, a plug-in, or the like, and includes the following software modules: a first display module 4551, a receiving module 4552, and a second display module 4553. These modules are logical modules, and may be randomly combined or divided based on a function to be implemented. The following describes functions of modules.

In some embodiments, the apparatus for processing a session message may be implemented by using a combination of software and hardware. For example, the apparatus for processing a session message provided in the some embodiments may be a processor in a form of a hardware decoding processor, programmed to perform the method for processing a session message provided in some embodiments. For example, the processor in the form of a hardware decoding processor may use one or more application-specific integrated circuits (ASICs), a DSP, a programmable logic device (PLD), a complex programmable logic device (CPLD), a field-programmable gate array (FPGA), or other electronic components.

FIG. 4 shows a schematic flowchart of a method for processing a session message according to some embodiments. In some embodiments, the method for processing a session message may be implemented by a server or a terminal alone, or may be implemented by the server and the terminal in cooperation. An example in which the method is implemented by the terminal is used, the method for processing a session message may include the following operations:

Operation 101: The terminal displays at least two session messages including a first session message and a second session message.

In some embodiments, a client, for example, an instant messaging client, is generally installed in the terminal. A user (that is, a target object) may perform instant messaging with another user by using the installed client in manners such as transmitting a session message in a form of voice, text, picture, animation, and the like, and making a voice call or a video call.

The target object performs a message session with another session object based on a session interface displayed by the client, and a session corresponding to the session interface may be a group session (that is, a session including at least three members) or a single person session.

During the session, session messages transmitted by the target object and another member in the session are displayed in the session interface of the target object. In some embodiments, a plurality of session messages are displayed in the session interface of the target object. The plurality of session messages includes the first session message and the second session message, and the first session message and the second session message may be both transmitted by the target object, or one may be transmitted by the target object and the other is transmitted by a session object of the target object, or may be both transmitted by the session object of the target object.

Operation 102: Display, in response to a message merging instruction, a third session message obtained by merging the first session message and the second session message, the message merging instruction being configured to instruct merging the first session message and the second session message.

In some embodiments, the target object may instruct merging two or more messages (for example, three or more) in the session interface by triggering the message merging instruction. In some embodiments, the message merging instruction is configured to merge two messages (for example, the first session message and the second session message) selected by the target object, and in a case that the target object needs to merge three or more session messages, the target object may implement the merging by triggering the message merging instruction for a plurality of times. In this way, when a plurality of consecutive messages transmitted by the user (the target object) are interrupted, the interrupted messages may be merged to avoid omission. When the user needs to summarize messages of a plurality of session objects in a group chat, messages of different session objects may be merged through message merging, so that the messages of different session objects are presented through one message. Therefore, communication efficiency of session messages and efficiency of user processing messages are improved.

Figure 5:
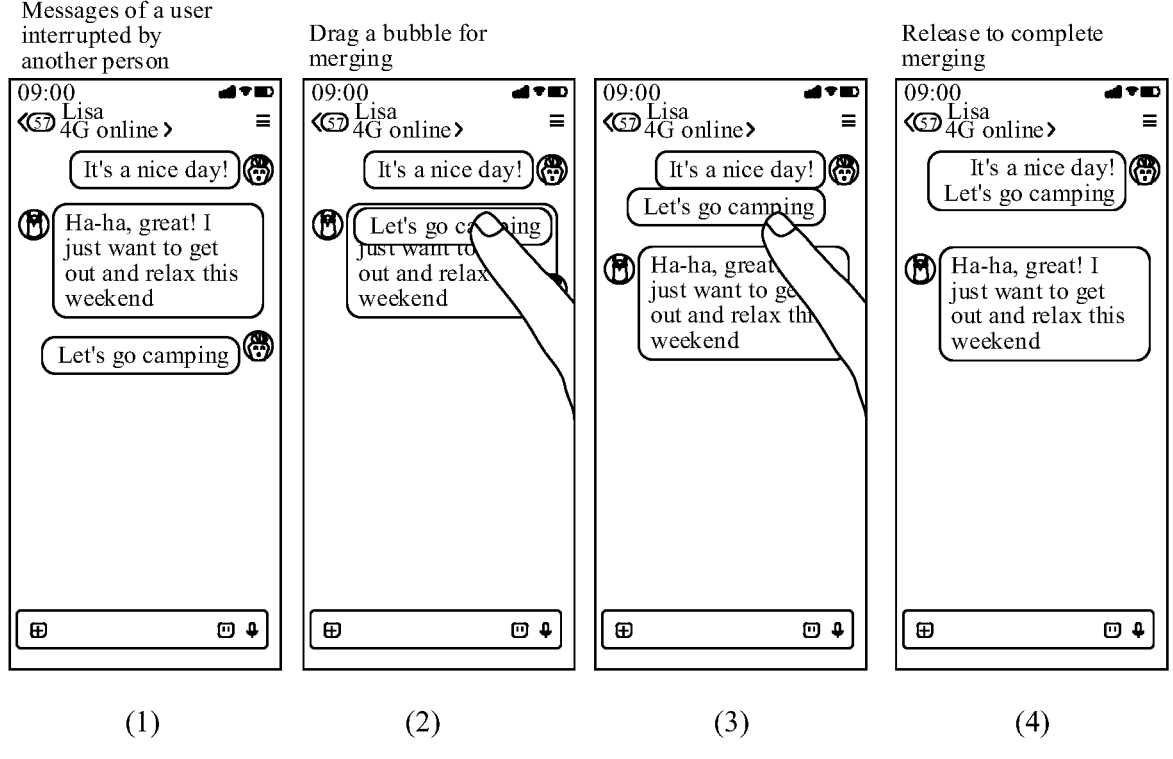
FIG. 5 is a schematic diagram of an interface of dragging a session message to implement message merging according to some embodiments.

A triggering manner of the message merging instruction is described. In some embodiments, the message merging instruction may be triggered based on the session interface. For example, the target object may implement triggering the message merging instruction by dragging a session message in the session interface. An example in which the target object drags the first session message in the session interface and merges the session messages transmitted by the target object is used. In some embodiments, the terminal displays, in a case that the dragging operation meets a message movement condition, in response to a dragging operation of the target object for the first session message, a process that the first session message is dragged in the session interface, and triggers, in a case that the first session message is dragged to a position of the second session message, the message merging instruction in response to that the dragging operation is released. FIG. 5 is a schematic diagram of an interface of dragging a session message to implement message merging according to some embodiments. Referring to FIG. 5, (1) of FIG. 5 is a session interface of displaying session messages according to transmitting times of the messages. It may be learned from (1) of FIG. 5 that consecutive messages "Let's go camping" and "It's a nice day!" transmitted by the user are interrupted by a session object. (2) of FIG. 5 shows a process that the user (the target object) drags the session message "Let's go camping" to move in the session interface. (3) of FIG. 5 shows an interface in which the user (the target object) drags the session message "Let's go camping" to a position of the session message "It's a nice day!". (4) of FIG. 5 shows a session message obtained by merging the session message "Let's go camping" and the session message "It's a nice day!" after the user (the target object) releases the dragging operation (that is, release) for the session message "Let's go camping".

The dragging operation for the first session message may include a consecutively performed selection operation (such as a click/tap operation and a long-press operation, that is, a press operation with press duration reaching a duration threshold) and pull operation for the first session message, and the message movement condition may include at least one of the following: operation duration reaching the duration threshold, and a length of an operation path of the pull operation reaching a length threshold.

In some embodiments, in a case that the dragging operation meets the message movement condition, the terminal controls the first session message to be in a floating state, and displays, along with performing of the dragging operation, a process that the first session message in the floating state is dragged in the session interface. The terminal may display the first session message in a bubble card. When receiving the first session message, the terminal displays the first session message by using a bubble card. In a case that the dragging operation of the target object for the first session message meets the message movement condition, the terminal controls the bubble card carried the first session message to be in a floating state, and displays a process that the bubble card is dragged in the session interface.

In some embodiments, it is determined that the first session message is dragged to the position of the second session message when at least one of the following situations is met: the first session message is dragged to an associated region on a periphery of a display region of the second session message; and the bubble card configured to carry the first session message overlaps a bubble card configured to carry the second session message. In some embodiments, the target object drags the first session message, that is, the target object selects the first session message as a to-be-merged session message; and the target object drags the first session message to the position of the second session message, that is, the target object selects the second session message as a session message to be merged with the first session message.

In a scenario in which the message merging instruction is triggered by dragging the session message, in some embodiments, the target object can drag only the session message whose transmitting duration (that is, a time interval between the transmitting time of the message and a current time) within a target duration range (which may be specifically set according to an actual requirement). For example, target duration is one minute, the target object can drag only a session message whose time interval between the transmitting time to the current time is in one minute. During practical implementation, in a case that the dragging operation meets the message movement condition, the terminal obtains a first time interval between a transmitting time of the first session message and the current time. In a case that the first time interval is less than or equal to a time interval threshold (that is, the target duration), the process that the first session message is dragged in the session interface; and in a case that the first time interval is greater than the time interval threshold, overtime prompt information is displayed, the overtime prompt information being configured to prompt that duration of merging the first session message is exceeded, and when the target object releases the dragging operation based on the overtime prompt information, the first session message is restored, that is, returned to a position before being dragged.

Figure 6:
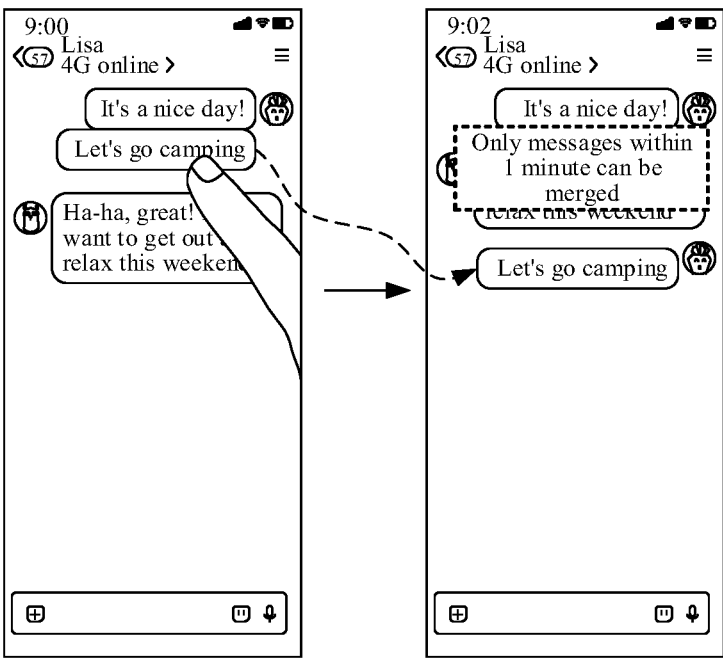
FIG. 6 is a schematic diagram of an interface of an overtime prompt in a process of merging messages according to some embodiments.

In some embodiments, the target object can merge only a session message whose transmitting duration is in the target duration, that is, transmitting duration of both the first session message and the second session message needs to be in the target duration. In some embodiments, in a case that the first session message is dragged to the position of the second session message, in response to that the dragging operation is released, first transmitting duration of the first session message and second transmitting duration of the second session message are obtained. In a case that at least one of the first transmitting duration and the second transmitting duration exceeds the target duration, the overtime prompt information is displayed, prompting that the user can merge only the session message whose transmitting duration is in the target duration, and the first session message is moved to a position before the dragging operation is performed. FIG. 6 is a schematic diagram of an interface of an overtime prompt in a process of merging messages according to some embodiments. Referring to FIG. 6, when the user drags the session message "Let's go camping" to the position of "It's a nice day!", and releases the dragging operation, because there is a message whose transmitting duration exceeds the target duration (which is 1 minute herein) in "Let's go camping" and "It's a nice day!", the overtime prompt information "Only messages within 1 minute can be merged" is displayed, and the dragged session message "Let's go camping" is restored to the position before being dragged.

In some embodiments, the time interval between the first session message and the second session message that are to be merged indicated by the target object needs to be in a specific duration range. In other words, in a case that the first session message is dragged to the position of the second session message, in response to that the dragging operation is released, a transmitting time interval between the transmitting time of the first session message and a transmitting time of the second session message is obtained. In a case that the transmitting time interval is less than a transmitting time interval threshold, the message merging instruction is triggered; and in a case that the time interval greater than the time interval threshold, an interval prompt information is displayed, and the first session message is moved to the position before the dragging operation is performed. The interval prompt information is configured to prompt that the transmitting time interval between the first session message and the second session message exceeds the transmitting time interval threshold, and may prompt a transmitting time interval that the message merging can be performed, for example, prompting that the transmitting time interval that the message merging can be performed is 1 minute.

Figures 7, 8A:
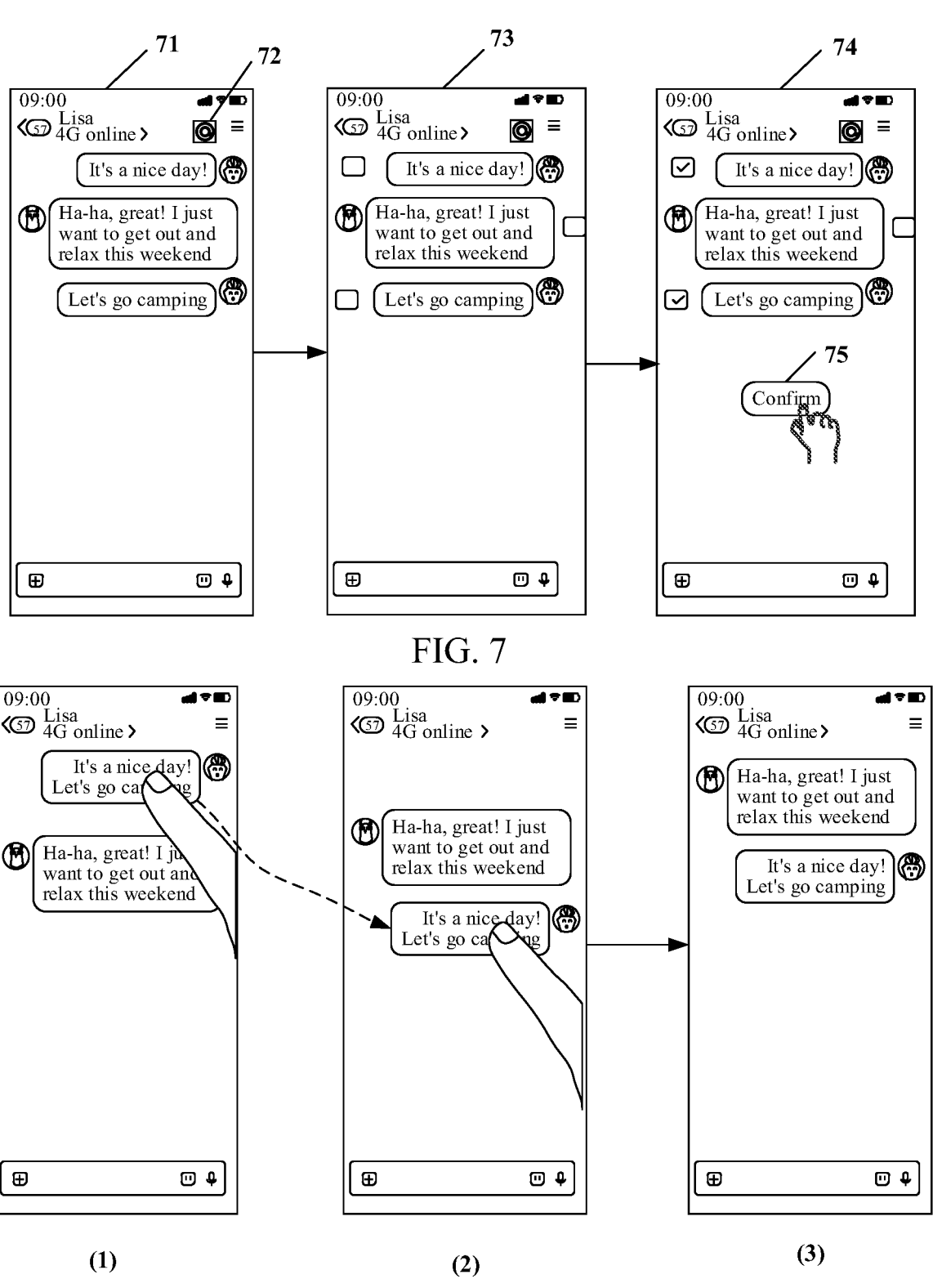
FIG. 7 is a schematic diagram of an interface of triggering a message merging instruction according to some embodiments.
FIG. 8A is a schematic diagram of an interface of adjusting an order of a merged session message according to some embodiments.

In some embodiments, the message merging instruction may further be triggered through a message merging function item. In some embodiments, the terminal displays the message merging function item in the session interface; controls, in response to a triggering operation for the message merging function item, the at least two session messages to be in a candidate state; and triggers the message merging instruction in response to a selection operation for the first session message and the second session message that are in the candidate state. For example, FIG. 7 is a schematic diagram of an interface of triggering a message merging instruction according to some embodiments. Referring to FIG. 7, a message merging function item 72 is displayed in a session interface 71. When the target object triggers the message merging function item 72 (for example, clicks/taps the message merging function item 72), the session messages in the session interface are in the candidate state, as shown in the session interface 73. When the target object selects "Let's go camping" and "It's a nice day!" based on a session interface 73, and clicks/taps a confirming control 75, as shown in a session interface 74, the message merging instruction is triggered.

Merging of the messages after the message merging instruction is triggered based on the message merging function item is described herein.

In some embodiments, the terminal may display the third session message obtained by merging the first session message and the second session message in the following manner: In a case that the transmitting time of the first session message is earlier than the transmitting time of the second session message, the terminal displays a process that the first session message automatically moves to the position of the second session message, and is merged with the second session message into the third session message; or in a case that the transmitting time of the first session message is earlier than the transmitting time of the second session message, the terminal displays a process that the first session message automatically moves to the position of the second session message, and displays the third session message obtained by merging the first session message and the second session message. In other words, after the first session message automatically moves to the position of the second session message, the terminal may present a process of merging the first session message and the second session message, or may only present a state after merging, that is, only presenting a merging result.

In some embodiments, the terminal may also display the third session message obtained by merging the first session message and the second session message in the following manner: In a case that the first session message and the second session message are not a session message with the latest transmitting time in the session interface, the terminal displays a process that the first session message is automatically moved to the position of the second session message, or the second session message is automatically moved to a position of the first session message, to be merged into the third session message, and the third session message is moved to below the session message with the latest transmitting time.

In a case that the first session message and the second session message are not the session message with the latest transmitting time in the session interface, the terminal may also display a process that the first session message is automatically moved to the position of the second session message, or the second session message is automatically moved to the position of the first session message, and display the third session message obtained by merging the first session message and the second session message. The third session message is located below the session message with the latest transmitting time.

In some embodiments, after displaying the third session message obtained by merging the first session message and the second session message, the terminal may adjust a position of the third session message obtained by merging in the session interface, that is, adjusting a message order of the third session message in the session interface. The terminal moves the position of the third session message in the session interface in response to an order adjustment instruction for the third session message, to change the message order of the third session message in the session interface.

In some embodiments, the target object may adjust the order of the third session message by dragging the third session message. In some embodiments, the terminal triggers the order adjustment instruction for the third session message in response to the dragging operation for the third session message in a case that operation duration of the dragging operation reaches the duration threshold, and controls, along with performing of the dragging operation, the third session message to synchronously move in the session interface, to adjust the message order of the third session message in the session interface.

FIG. 8A is a schematic diagram of an interface of sorting and adjusting a session message after merging according to some embodiments. Referring to FIG. 8A, a message dragged by the target object in (1) is the third session message obtained by merging the "It's a nice day!" and the "Let's go camping". In a case that dragging duration for the message reaches the duration threshold, movement of the message in the session interface is triggered. In a case that the target object drags the third session message to below the session message "Ha-ha, great! I just want to get out and relax this weekend", and releases the dragging operation, as shown in (2), the order of the third session message is adjusted, as shown in (3), and after the dragging operation is released, the order of the third session message in the session interface is located after the "Ha-ha, great! I just want to get out and relax this weekend".

In some embodiments, the target object may also adjust the order of the third session message through a sorting control in the session interface. In some embodiments, after displaying the third session message obtained by merging the first session message and the second session message, the terminal controls the third session message to be in a state of order to be adjusted, and displays the sorting control in the session interface. The sorting control includes an upward adjustment control and a downward adjustment control. The target object triggers (for example, single-clicks/taps) the upward adjustment control, the order of the third session message is moved from bottom to top in the session interface. For example, each time the upward adjustment control is single-clicked/tapped, the third session message is moved upward by a position. In a case that the target object triggers (for example, single-clicks/taps) the downward adjustment control, the order of the third session message is moved from top to bottom in the session interface. For example, each time the downward adjustment control is single-clicked/tapped, the third session message is moved downward by a position.

Figure 8B:
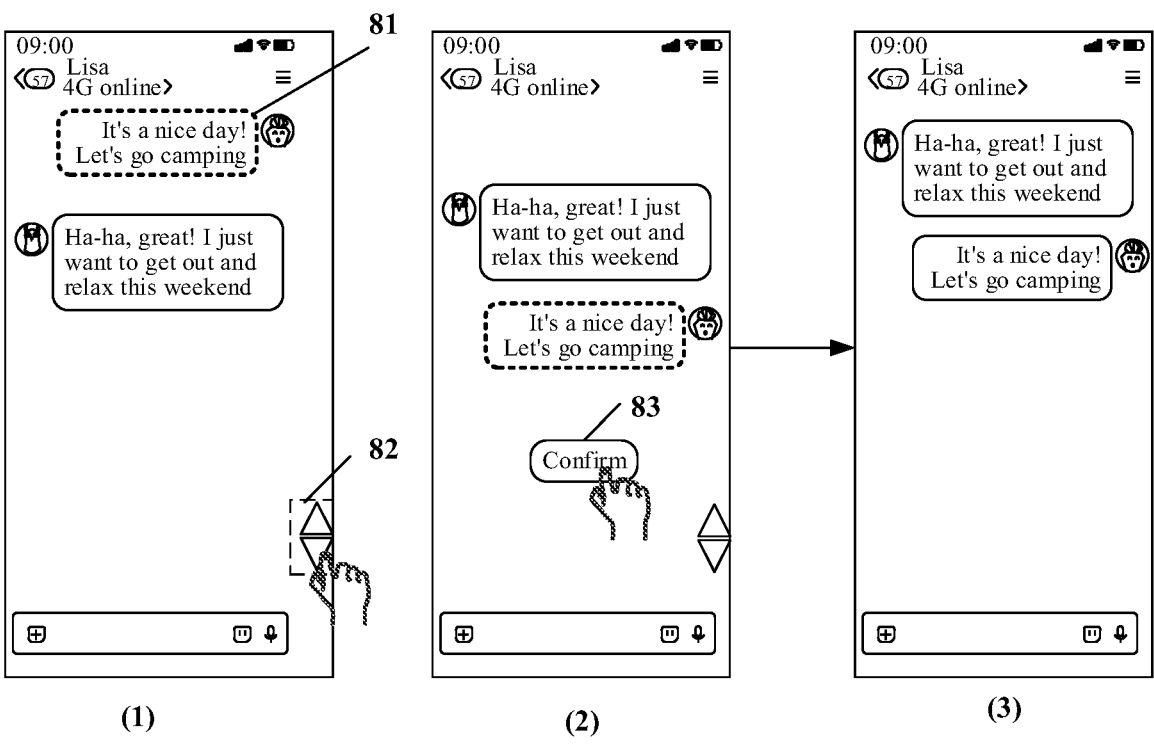
FIG. 8B is a schematic diagram of an interface of adjusting an order of a merged session message according to some embodiments.

For example, FIG. 8B is a schematic diagram of an interface of sorting and adjusting a session message after merging according to some embodiments. Referring to FIG. 8B, after a third session message 81 is obtained by merging the "It's a nice day!" and the "Let's go camping" in (1) FIG. 8B, the session message 81 is in a state of order to be adjusted. The terminal displays a sorting control 82 in the session interface, and the sorting control includes an upward adjustment control and a downward adjustment control. As shown in (1) of FIG. 8B, in a case that the target object clicks/taps the downward adjustment control, the third session message 81 is triggered to move downward by a position, that is, moving to below a session message that is below and adjacent to the third session message in the session interface, and a confirming control 83 is displayed. In a case that the target object clicks/taps the confirming control 83 to trigger a confirming instruction, adjustment for the order of the third session message is implemented, as shown in (3) of FIG. 8B.

In some embodiments, when sorting and adjusting the merged session message (for example, the third session message), the target object can perform adjustment only in a target region range of the session interface. In some embodiments, the terminal displays the target region in a process of moving the position of the third session message; and displays movement prompt information in a case that the third session message is moved to an edge of the target region, the movement prompt information being configured to prompt that the order of the third session message can only be adjusted in the target region.

In some embodiments, because the third session message is obtained by moving the first session message to the position of the second session message and merging the first session message and the second session message, the transmitting time of the obtained third session message after merging is the transmitting time of the second session message. When the target object sorts and adjusts the merged session message (for example, the third session message), an adjusted position can be only within a period of time (for example, 1 minute). For example, the transmitting time of the third session message is 11:15, and a position movement range of the third session message is between 11:14 and 11:16. In some embodiments, in a process that the terminal moves the position of the third session message, in a case that the third session message is moved to a target position, the target position enabling the third session message to be adjacent to a target historical session message, and a transmitting time interval between the third session message and the target historical session message reaches the time interval threshold, an interception line is displayed between the third session message and the target historical session message, the interception line being configured to intercept the third session message in a case that the third session message is moved to the interception line. That is, the third session message cannot cross the interception line to be moved to a region in which the target historical session message is located. Therefore, a movement range and a sorting range of the message is controlled, avoiding content confusion caused by an excessively large transmitting time interval between adjacent messages.

Figure 8C:
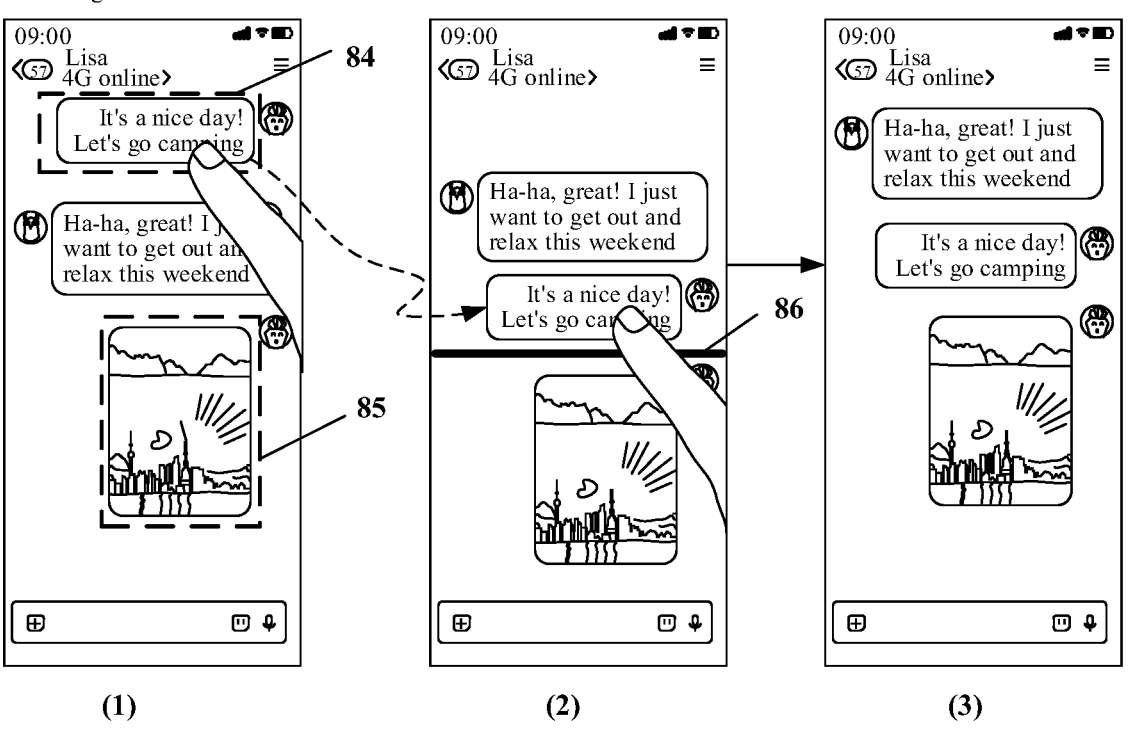
FIG. 8C is a schematic diagram of an interface of adjusting an order of a merged session message according to some embodiments.

FIG. 8C is a schematic diagram of an interface of sorting and adjusting a session message after merging according to some embodiments. Referring to FIG. 8C, a session message 84 is the third session message obtained by merging messages. When the user drags the session message 84 to adjust an order of the session message 84 in the session interface, in a case that the session message 84 is moved to be adjacent to a session message 85 (that is, the target historical session message), and a transmitting time interval between the session message 84 and the session message 85 reaches the time interval threshold, an interception line 86 is displayed between the session message 84 and the session message 85, as shown in (2) of FIG. 8C. Therefore, when the user continues to drag the session message 84 downward, the session message 84 is intercepted, so that the user cannot move the session message 84 to below the session message

85, and when the user releases the dragging operation at a position shown in (2) of FIG. 8C, the session message 84 is controlled to be displayed at a release position corresponding to the dragging operation, as shown in (3) for FIG. 8C.

In some embodiments, after the third session message is obtained by merging the first session message and the second session message, the target object may also adjust orders of content corresponding to the first session message and content corresponding to the second session message in the merged message. In some embodiment, the content corresponding to the first session message is first content, the content corresponding to the second session message is second content. In the session interface, after displaying the third session message obtained by merging the first session message and the second session message, the terminal adjusts a position of at least one of the first content and the second content in the third session message in response to a position adjustment instruction for the content in the third session message, to change an order of the first content and the second content in the third session message. For example, after displaying the third session message obtained by merging the first session message and the second session message, the terminal controls the first content and the second content in the third session message to be in a to-be-ordered state. If the user does not need to adjust the orders of the first content and the second content, the user may trigger the confirm instruction, for example, click/tap a blank region in the session interface. If the user needs to adjust the orders of the first content and the second content, the user may trigger the corresponding position adjustment instruction by dragging the first content or the second content, for example, when the first content "It's a nice day!" is sorted before the second content "Let's go camping", the position of the first content may be dragged after the position of the second content.

Figures 9A, 9B:
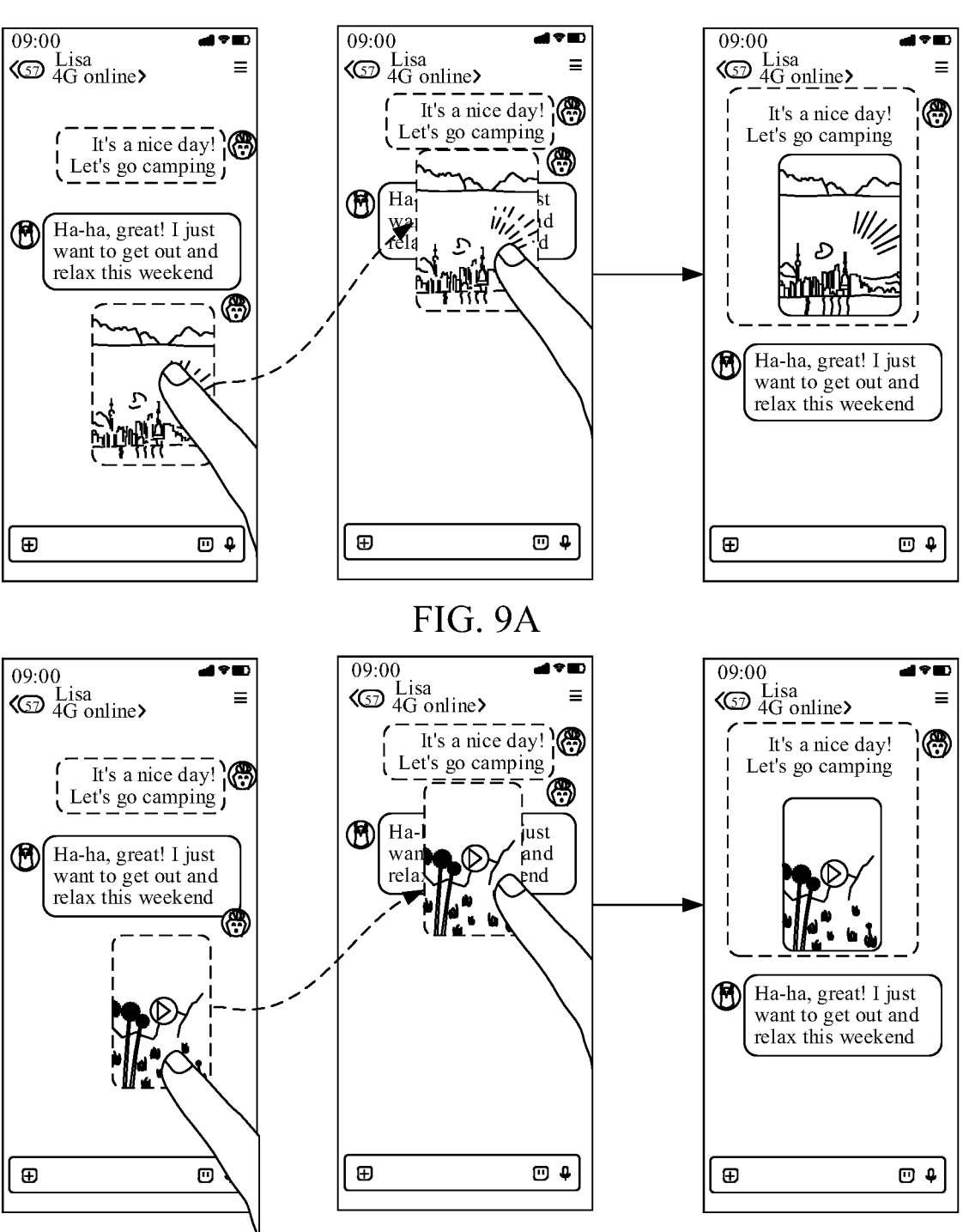
FIG. 9A is a schematic diagram of an interface of merging different types of session messages according to some embodiments.
FIG. 9B is a schematic diagram of an interface of merging different types of session messages according to some embodiments.
Figures 9C, 9D:
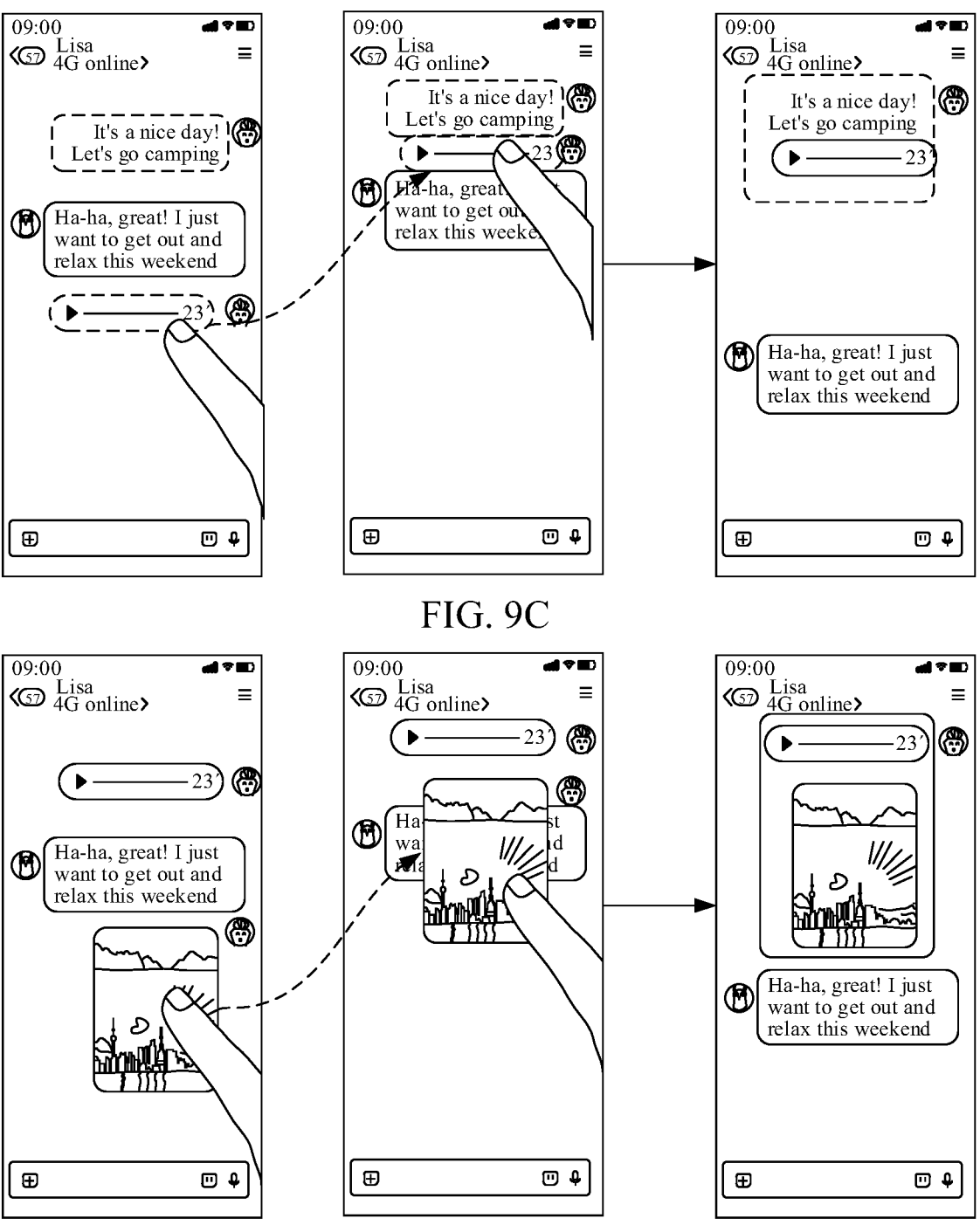
FIG. 9C is a schematic diagram of an interface of merging different types of session messages according to some embodiments.
FIG. 9D is a schematic diagram of an interface of merging different types of session messages according to some embodiments.
Figure 9E:
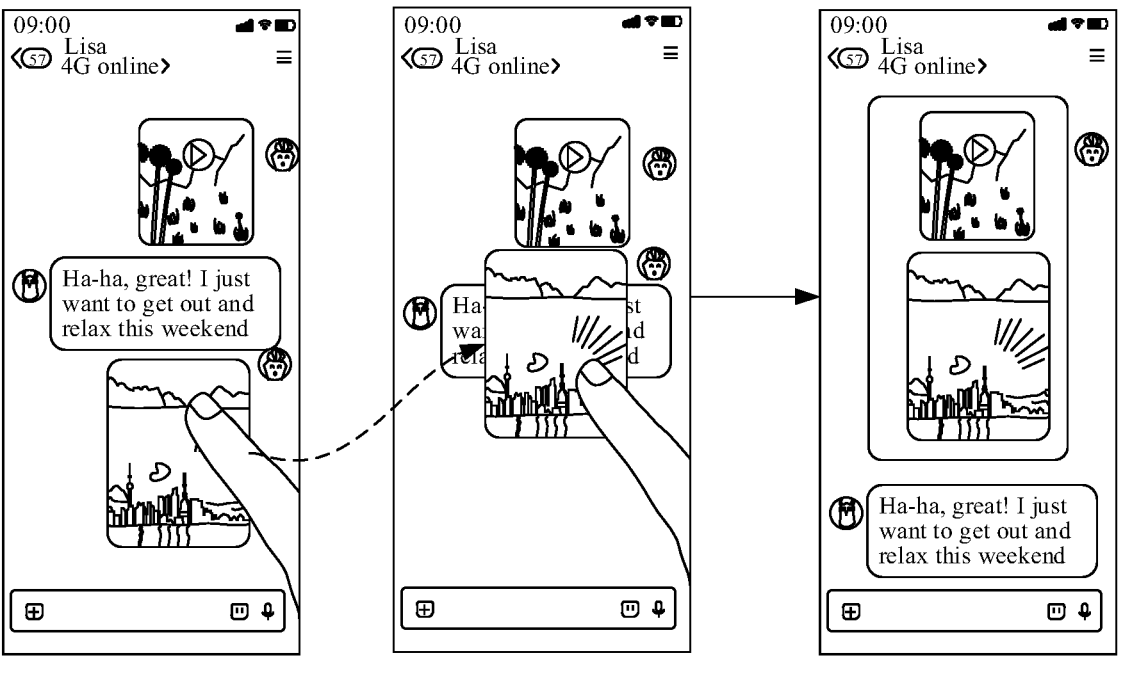
FIG. 9E is a schematic diagram of an interface of merging different types of session messages according to some embodiments.
Figure 9F:
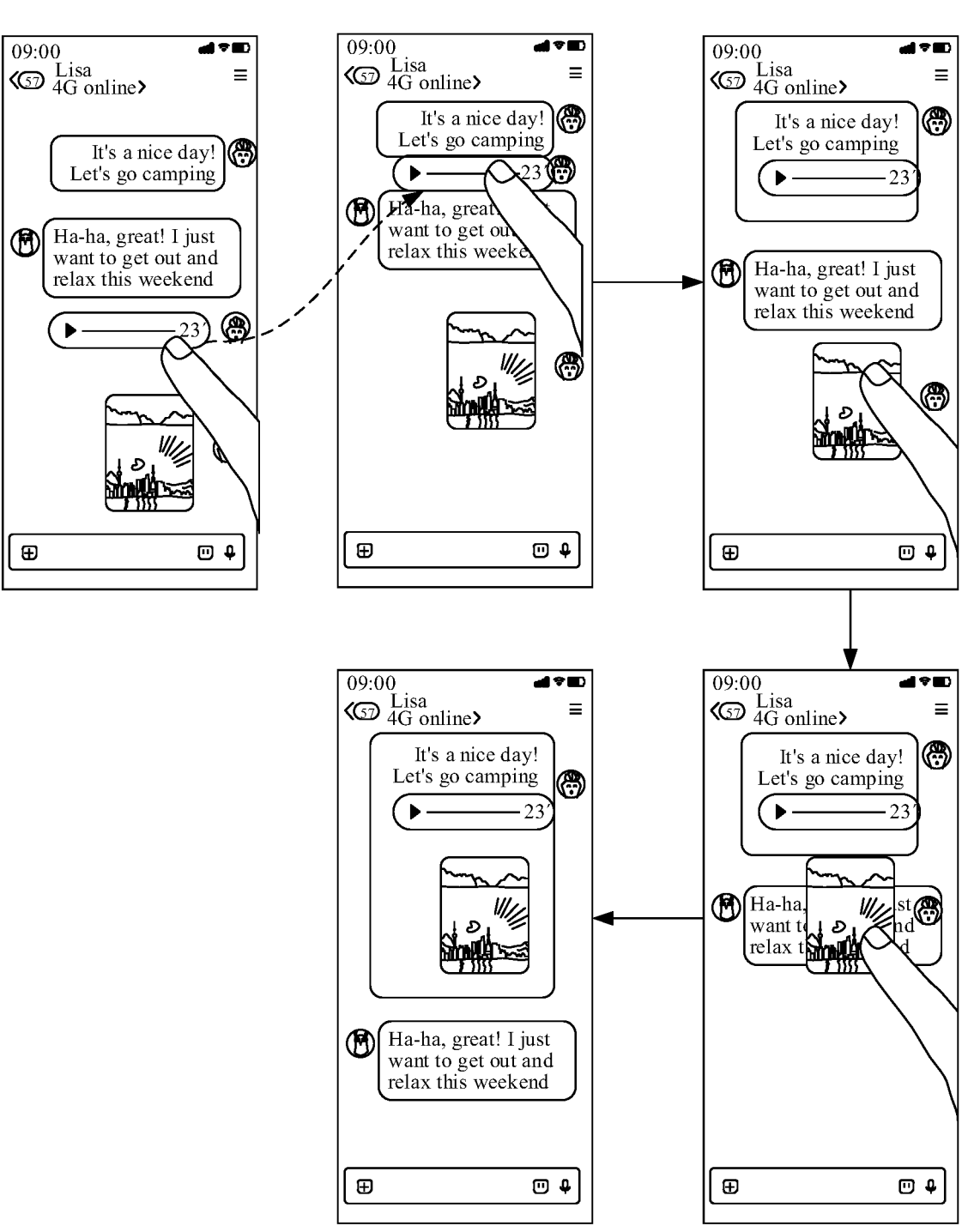
FIG. 9F is a schematic diagram of an interface of merging different types of session messages according to some embodiments.

A type of the merged session messages is described below. In some embodiments, a type of the first session message and a type of the second session message specified by the target object for merging may be at least one of the following: a text message, a voice message, a picture message, a video message, an emoticon message, and a rich media message. FIG. 9A to FIG. 9F are a schematic diagram of an interface of merging different types of session messages according to some embodiments. Referring to FIG. 9A, the user drags the picture message to a position of the text message, implementing merging the picture message and the text message. Referring to FIG. 9B, the user drags the video message to the position of the text message, implementing merging the video message and the text message. Referring to FIG. 9C, the user drags the voice message to the position of the text message, implementing merging the voice message and the text message. Referring to FIG. 9D, the user drags the picture message to a position of the voice message, implementing merging the picture message and the voice message. Referring to FIG. 9E, the user drags the picture message to a position of the video message, implementing merging the picture message and the video message. In some embodiments, the user may drag messages for a plurality of times to implement merging for a plurality of session messages. Referring to FIG. 9F, the user first drags the voice message to the position of the text message, implementing merging the voice message and the text message, to obtain a merged message, and then drags the picture message to a position of the merged message, implementing merging the picture message and the merged message, thereby implementing merging the voice message, the text message, and the picture message. Certainly, in some embodiments, the user may trigger the message merging instruction for a plurality of times, to implement merging two or more message types of session messages.

In some embodiments, the user may merge the session messages transmitted by the user, and in addition, the user may merge the session messages transmitted by the user and other session objects, or only merge the session messages transmitted by other session objects. In some embodiments, in a case that a transmitting object of the first session message is the target object, and a transmitting object of the second session message is a session object of the target object, the terminal may display the third session message obtained by merging the first session message and the second session message in the following manner: The terminal displays a message copy of the second session message; and displays the third session message obtained by merging the first session message and the message copy of the second session message in the session interface, or displays a process that the third session message is obtained by merging the first session message and the message copy of the second session message. For example, the terminal dynamically displays a process that the first session message and the message copy of the second session message are gradually close to each other from being independent of each other to being eventually merged into the third session message.

When the user triggers the message merging instruction by performing the dragging operation for the session message, if the session message dragged by the user is the session message transmitted by the user, movement for the session message is triggered; and if the session message dragged by the user is the session message transmitted by the session object of the user, movement for a copy of the session message is triggered. In some embodiments, the session message dragged by the user is the session message transmitted by the session object of the user, movement and merging for the session message may be triggered.

Triggering of the message merging instruction in a case that the transmitting object of the first session message is the target object, and the transmitting object of the second session message is the session object of the target object is described. In some embodiments, the message merging instruction may be triggered in the following manner: The terminal controls, in response to a press operation for the first session message, the first session message to be in a selected state; displays a copy of the second session message in response to a dragging operation for the second session message in a process of performing the press operation, and displays a process that the copy of the second session message is dragged in the session interface; and triggers, in a case that the second session message is dragged to a position of the first session message, the message merging instruction in response to that the dragging operation is released.

Figure 10A:
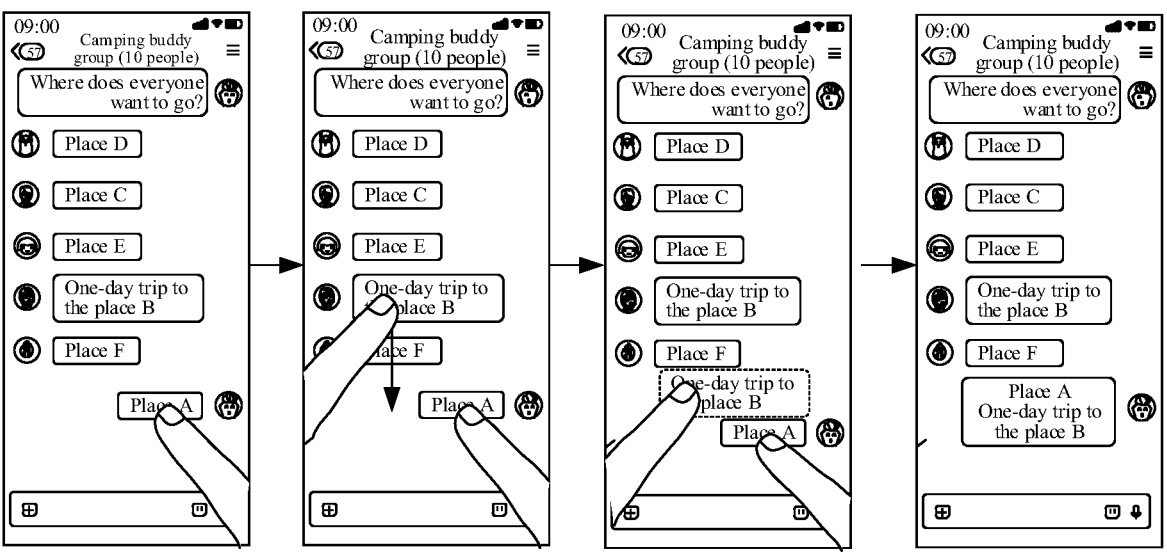
FIG. 10A is a schematic diagram of an interface of merging session messages of different session objects according to some embodiments.

FIG. 10A is a schematic diagram of an interface of merging session messages of different session objects according to some embodiments. Referring to FIG. 10A, when the user presses a session message "Place A" transmitted by the user with one finger, the terminal determines the session message is a to-be-merged session message, and controls the session message to be in the selected state, and in a process that the user presses the session message "Place A", the user drags a session message "One-day trip to the place B" transmitted by another person with another finger. The terminal generates and displays a message copy of the session message "One-day trip to the place B" in response to a dragging operation for the session message "One-day trip to the place B", displays a process that the message copy of "One-day trip to the place B" in the session interface, and triggers, in a case that the message copy of the "One-day trip to the place B" is dragged to a position of the session message "Place A", the message merging instruction in response to the dragging operation is released. A process that the "One-day trip to the place B" and the "Place A" are merged is displayed in the session interface.

Figure 10B:
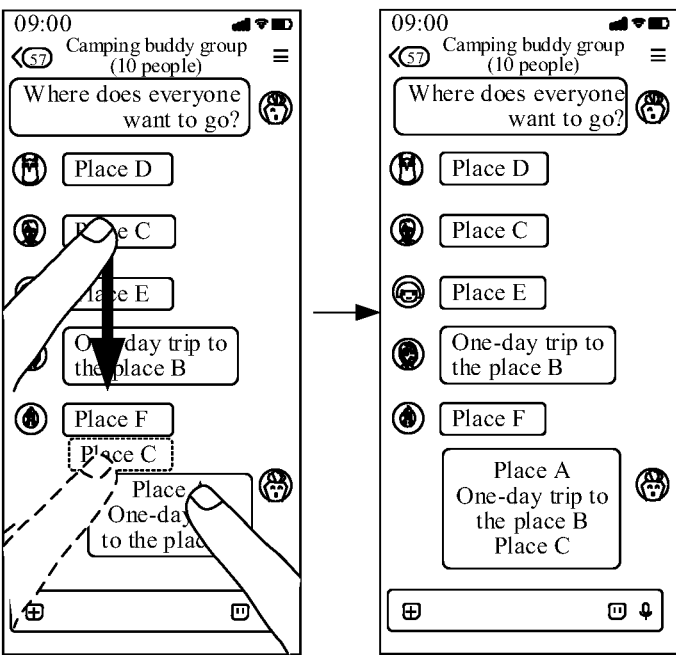
FIG. 10B is a schematic diagram of an interface of merging session messages of different session objects according to some embodiments.

In some embodiments, in a process of performing a press operation for the first session message, the user may merge a plurality of session messages transmitted by another person and session messages transmitted by the user by dragging the session messages transmitted by the another person for a plurality of times. In other words, after displaying the third session message obtained by merging the first session message and the second session message, in a process that the target object performs the press operation for the first session message, the terminal displays, in response to a dragging operation for the fourth session message, a process that a fourth session message is dragged in the session interface; and displays, in a case that the fourth session message is dragged to a position of the third session message, a fifth session message obtained by merging the fourth session message and the third session message in response to that the dragging operation is released, or displays a process that the fifth session message is obtained by merging the fourth session message and the third session message. FIG. 10B is a schematic diagram of an interface of merging session messages of different session objects according to some embodiments. The figure follows FIG. 10A, and a session message "Place A, One-day trip to the place B" is the third session message obtained by performing an operation in FIG. 10A. In a process that the user continuously performs the press operation, the user drags another session message again, for example, "Place C" (that is, the fourth session message) shown in FIG. 10B. In a case that a copy of the "Place C" is dragged to a position of the "Place A, One-day trip to the place B", a process that the fifth session message (Place A, One-day trip to the place B, Place C) is obtained by merging the fourth session message and the third session message is displayed.

In a process that the user continuously performs the press operation and drags the session messages of another person for message merging, a number of merged session messages may be displayed in the session interface. In this way, it is convenient for the user to clearly learn the number of the merged session messages.

In a case that the transmitting object of the first session message is the target object, and the transmitting object of the second session message is the session object of the target object, in some embodiments, the message merging instruction may be triggered in the following manner: The terminal controls, in response to the press operation for the first session message, in a case that the press operation meets a press condition, the session messages in the session interface to be in a candidate state; and triggers the message merging instruction in response to a triggering operation for the second session message in the candidate state in a process of performing the press operation. Correspondingly, after the message merging instruction is triggered, the third session message obtained by merging the first session message and the second session message is displayed in the following manner: displaying a process that a copy of the second session message automatically moves to a position of the first session message, and displaying a third session message obtained by merging the copy of the second session message and the first session message; or displaying a process that the copy of the second session message automatically moves to the position of the first session message, and is merged with the first session message into the third session message. In a process of performing the press operation, the user may merge a plurality of session messages by clicking/tapping messages of another person for a plurality of times. In some embodiments, in a process of performing the press operation, the terminal displays, in response to a triggering operation for a sixth session message, a process that a copy of the sixth session message automatically moves to a position of the third session message, and is merged with the third session message into a seventh session message.

In some embodiments, it is determined that the press condition is met in a case that at least one of the following conditions is met: press duration of the press operation reaches a duration threshold, and pressure of the press operation reaches a pressure threshold.

Figure 10C:
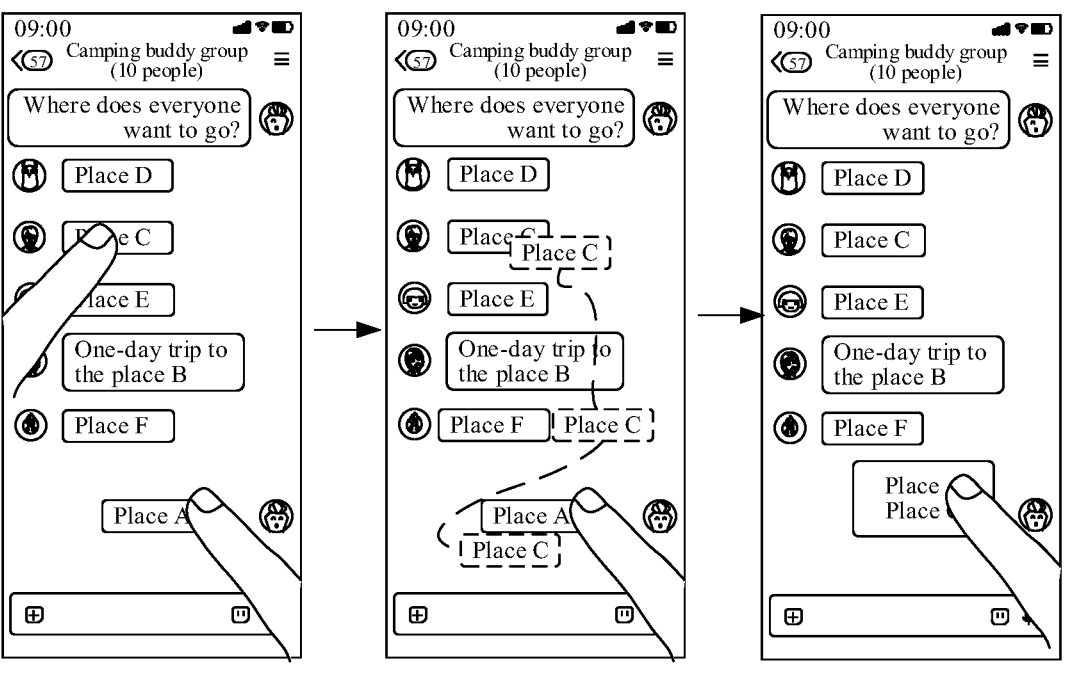
FIG. 10C is a schematic diagram of an interface of merging session messages of different session objects according to some embodiments.

FIG. 10C is a schematic diagram of an interface of merging session messages of different session objects according to some embodiments. Referring to FIG. 10C, when the user presses the session message "Place A" transmitted by the user with one finger, the terminal controls another session message in the session interface to be in the candidate state. In a process that the user presses the session message "Place A", the user clicks/taps the session message "Place C" transmitted by another person with another finger. The terminal triggers the message merging instruction in response to a click/tap operation for the session message "Place C", generates and displays a message copy of the session message "Place C", and displays a process that the message copy of the "Place C" automatically moves to a position of the session message "Place A", and is merged with the "Place A" in the session interface. In a process that the user continuously performs the press operation, the user may merge a plurality of messages by clicking/tapping messages of another person. For example, after "Place A, Place C" is obtained by merging the session messages "Place C" and "Place A", in the process that the user continuously performs the press operation, when the user clicks/taps "Place D", merging of the "Place D" and the "Place A, Place C" is triggered. In other words, a message copy of the session message "Place D" is generated and displayed, and a process that the message copy of the "Place D" automatically moves to a position of the session message "Place A, Place C", and is merged to the "Place A, Place C" is displayed in the session interface. In the process that the user continuously performs the press operation, the click/tap operation for the session message of another person may be performed for a plurality of times.

Figure 11:
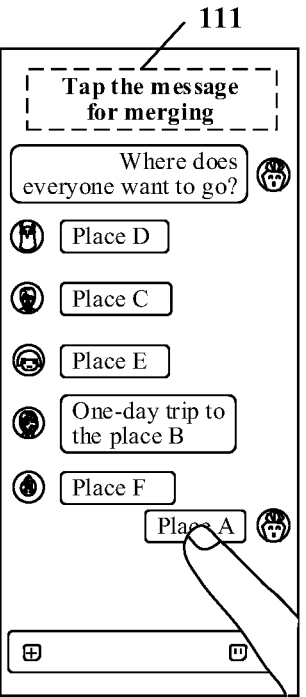
FIG. 11 is a schematic diagram of an interface of performing a merging operation according to some embodiments.

For ease of user operation, an operation for merging may be guided, that is, guide information configured for guiding the user to trigger an operation of the message merging instruction is displayed in the session interface. The guide information may be in a form of at least one of text, a pattern, an animation, and a video, and is configured for guiding the target object to perform a target operation to trigger the message merging instruction. FIG. 11 is a schematic diagram of an interface of performing a merging operation according to some embodiments. Referring to FIG. 11, when the user presses the session message transmitted by the user, text is used in the session interface to prompt the user that by clicking/tapping another session message, the another session message and the currently pressed session message can be merged, as prompt information 111 in FIG. 11, that is, "Tap the message for merging".

Figure 12:
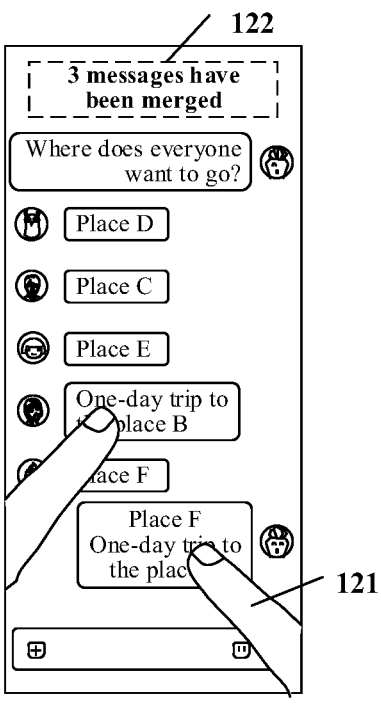
FIG. 12 is a schematic diagram of an interface of displaying a number of session messages that are merged according to some embodiments.

In a process that the user continuously performs the press operation and clicks/taps the session messages of another person for message merging, a number of merged session messages may be displayed in the session interface. FIG. 12 is a schematic diagram of an interface of displaying a number of session messages that are merged according to some embodiments. Referring to FIG. 12, in a process that a finger 121 of the user continuously perform the press operation, the user performs the click/tap operation of messages with another finger for a plurality of times, to merge a plurality of session messages, and a number 122 of the merged session messages are displayed in the session interface.

In some embodiments, if the user merges a message of another person, the user needs to obtain authorization of the another person. In some embodiments, in a case that the transmitting object of at least one of the first session message and the second session message is the session object of the target object, before the third session message obtained by merging the first session message and the second session message in the session interface, the terminal displays authorization prompt information and a corresponding determining function item. The authorization prompt information is configured to prompt to obtain authorization for performing a merging operation on a session message of the session object. The terminal transmits an authorization request to the session object in response to a triggering operation for the determining function item, the authorization request being configured to request authorization for performing the merging operation on the session message of the session object. The terminal displays the third session message obtained by merging the first session message and the second session message in the session interface in a case that the authorization for performing the merging operation on the session message of the session object is obtained.

In some embodiments, after displaying the third session message obtained by merging the first session message and the second session message, the terminal may provide a function item for processing the third session message for the user. In some embodiments, the terminal displays at least one message processing function item corresponding to the third session message, and each message processing function item corresponds to a processing operation, for example, the processing operation may be a copying operation, a forwarding operation, a sharing operation, an editing operation, and the like; and performs, in response to a triggering operation for a target message processing function item in the at least one message processing function item, a target processing operation indicated by the target message processing function item on the third session message. The message processing function item displayed in the terminal may include at least one of the following function items: a transmitting function item configured to transmit a message, a forwarding function item configured to forward a message, a copying function item configured to copy a message, a file generation function item configured to generate a target format file (such as a text format file, that is, a .txt file), a meeting minutes function item configured to generate meeting minutes, a voting function item configured for voting for content in a message, and the like. Setting of a specific function of the message processing function item may be set according to an actual requirement.

In a case that the third session message includes at least two pieces of sub-contents, and the target message processing function item is the voting function item, the performing a target processing operation indicated by a target message processing function item on the third session message may include: displaying a voting message corresponding to the third session message, the voting message including: options corresponding to the pieces of sub-content and a voting operation control, the voting operation control being configured for voting for sub-content selected based on the options. In some embodiments, the terminal may display the voting message corresponding to the third session message in the following manner: displaying the voting message corresponding to the third session message in the session interface; or displaying a presenting floating layer, and displaying the voting message corresponding to the third session message in the presenting floating layer; or displaying a vote information interface, and displaying the voting message corresponding to the third session message in the vote information interface.

Figure 13A:
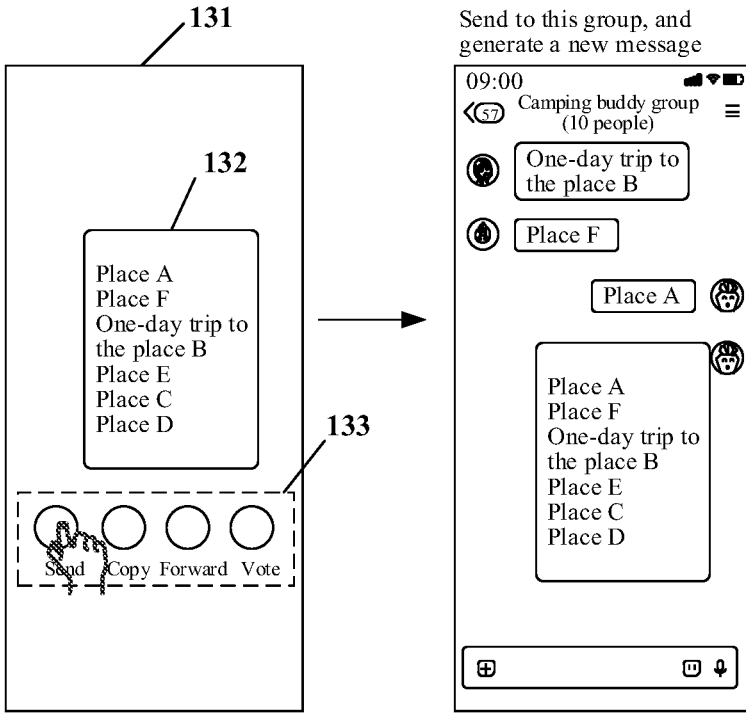
FIG. 13A is a schematic diagram of an interface of performing message processing based on a message processing function item according to some embodiments.
Figure 13B:
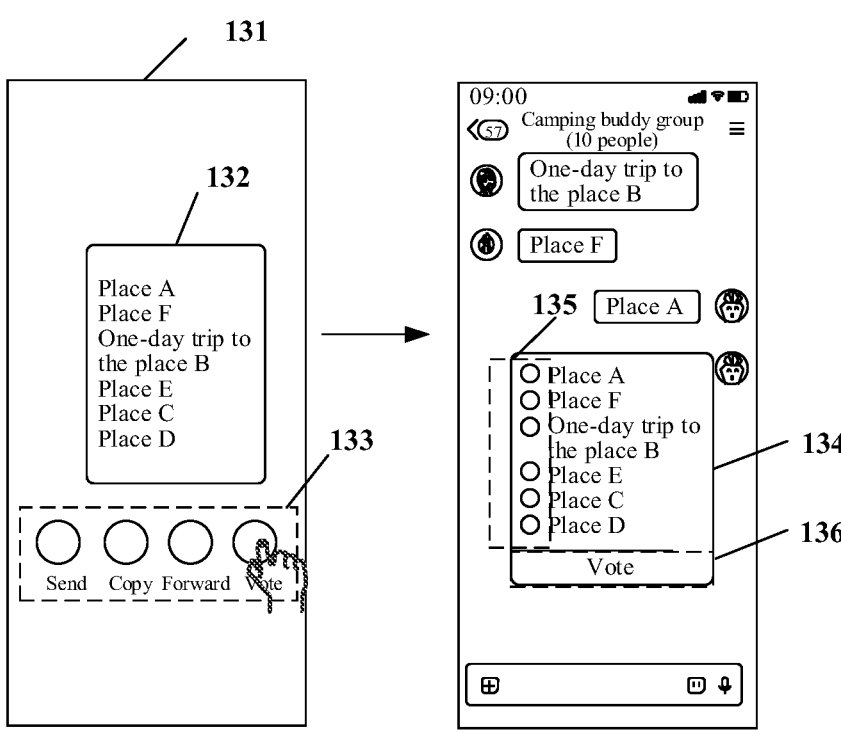
FIG. 13B is a schematic diagram of an interface of performing message processing based on a message processing function item according to some embodiments.

FIG. 13A and FIG. 13B are a schematic diagram of an interface of performing message processing based on a message processing function item according to some embodiments. Referring to FIG. 13A, after displaying the third session message obtained by merging the first session message and the second session message, the terminal displays a merging message processing interface 131, and displays a third session message 132 obtained by merging and a message processing function item 133 corresponding to the third session message 132 in the message processing interface. When the user triggers a "Send" function item, the third session message 132 is transmitted as a new session message into the session interface. Referring to FIG. 13B, when the user triggers a "Vote" function item, the terminal displays a voting message 134 corresponding to the third session message in the session interface, and the voting message includes: options 135 corresponding to the pieces of sub-content and a voting operation control 136. When the user selects vote content based on the options 135 corresponding to the pieces of sub-content, for example, the user clicks/taps options corresponding to the "Place A" and "One-day trip to Place B", and clicks/taps the voting operation control 136, the "Place A" and "One-day trip to Place B" are voted.

Figure 14:
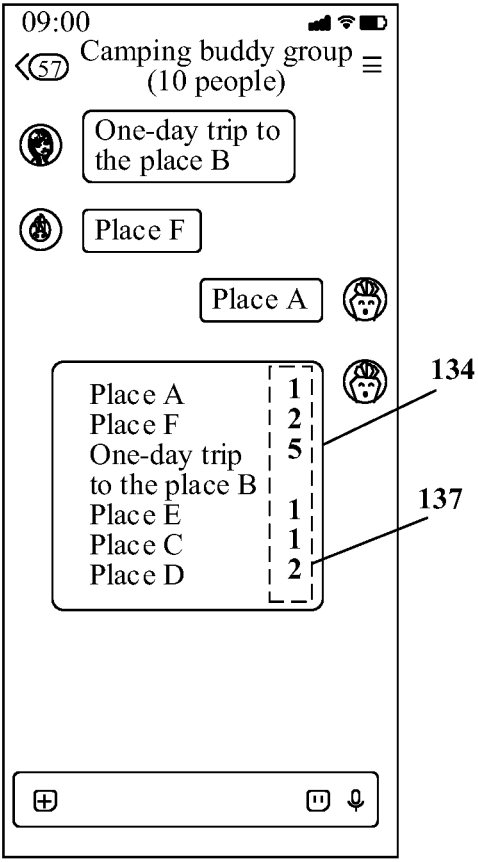
FIG. 14 is a schematic diagram of an interface of displaying a voting result according to some embodiments.

In some embodiments, after displaying the voting message corresponding to the third session message, the terminal displays a voting result of the corresponding sub-content in an associated region of each piece of sub-content in the voting message. The voting result is configured to indicate a number of the session objects voting for the corresponding pieces of sub-content. FIG. 14 is a schematic diagram of an interface of displaying a voting result according to some embodiments. Referring to FIG. 14, a voting result 137 of the corresponding pieces of sub-content in the associated region of the pieces of sub-content in the voting message 134, for example, a number of the session objects voting for the "Place A" is 1, and a number of the session objects voting for the "One-day trip to the place B" is 5 as the most.

In some embodiments, a vote time for the user is limited. In some embodiments, after the terminal displays the voting message corresponding to the third session message, the terminal obtains display duration of the voting message. In a case that the display duration of the voting message reaches a display duration threshold (which may be set according to an actual requirement, for example, 10 minutes), display of the voting operation control is canceled, and end indication information configured to instruct that the vote ends is displayed in the voting message.

In some embodiments, in a case that the target message processing function item is the forwarding function item, after the user triggers the forwarding function item, the terminal displays at least one forwarding object for selection, where the forwarding object and the target object have a social correlation relationship (for example, the target object and the forwarding object are in a friend relationship in the client); and transmits the third session message to a target forwarding object in response to a selection instruction for the target forwarding object in the at least one forwarding object. In some embodiments, the terminal may display the at least one forwarding object for selection in the following manner: The terminal displays a forwarding object selection interface; and displays the at least one forwarding object for selection in the forwarding object selection interface; or displays a presenting floating layer, and displays the at least one forwarding object for selection in the presenting floating layer.

In some embodiments, in a case that the target message processing function item is the meeting minutes function item, meeting minutes corresponding to the third session message is generated in response to a triggering operation for the meeting minutes function item; and the meeting minutes is stored in response to a storage instruction for the meeting minutes.

In some embodiments, the meeting minutes includes a title of the meeting minutes, a minute time of the meeting minutes, and a body of the meeting minutes. In some embodiments, in a case that the third session message includes at least two pieces of sub-content, the terminal may generate the meeting minutes corresponding to the third session message in the following manner: semantically analyzing content of the third session message, and generating the title of the meeting minutes based on an analysis result; obtaining a transmitting time corresponding to each piece of sub-content, and determining the minute time of the meeting minutes based on the obtained transmitting time; and generating the meeting minutes including the title and the minute time by using the content of the third session message as the body of the meeting minutes.

In some embodiments, the title of the meeting minutes may be obtained through prediction by using a pre-trained neural network model. In some embodiments, the third session message is inputted to the neural network model, and the title of the meeting minutes is outputted.

According to some embodiments, the target object triggers the message merging instruction, because the message merging instruction indicates merging the first session message and the second session message, that is, the target object specifies merging the first session message and the second session message, the electronic device can merge the first session message and the second session message specified by the target object in the session interface in response to the message merging instruction, so that omission of transmitted messages can be avoided by merging the interrupted messages. When the user needs to summarize messages of a plurality of session objects in a group chat, the messages of different session objects may be merged through message merging, so that the messages of different session objects are presented as one message, improving the communication efficiency of the messages. Moreover, compared with that the messages are presented in the session interface only according to transmitting times of the messages in the related art, utilization of hardware processing resources and display resources of the electronic device is improved.

Figure 15:
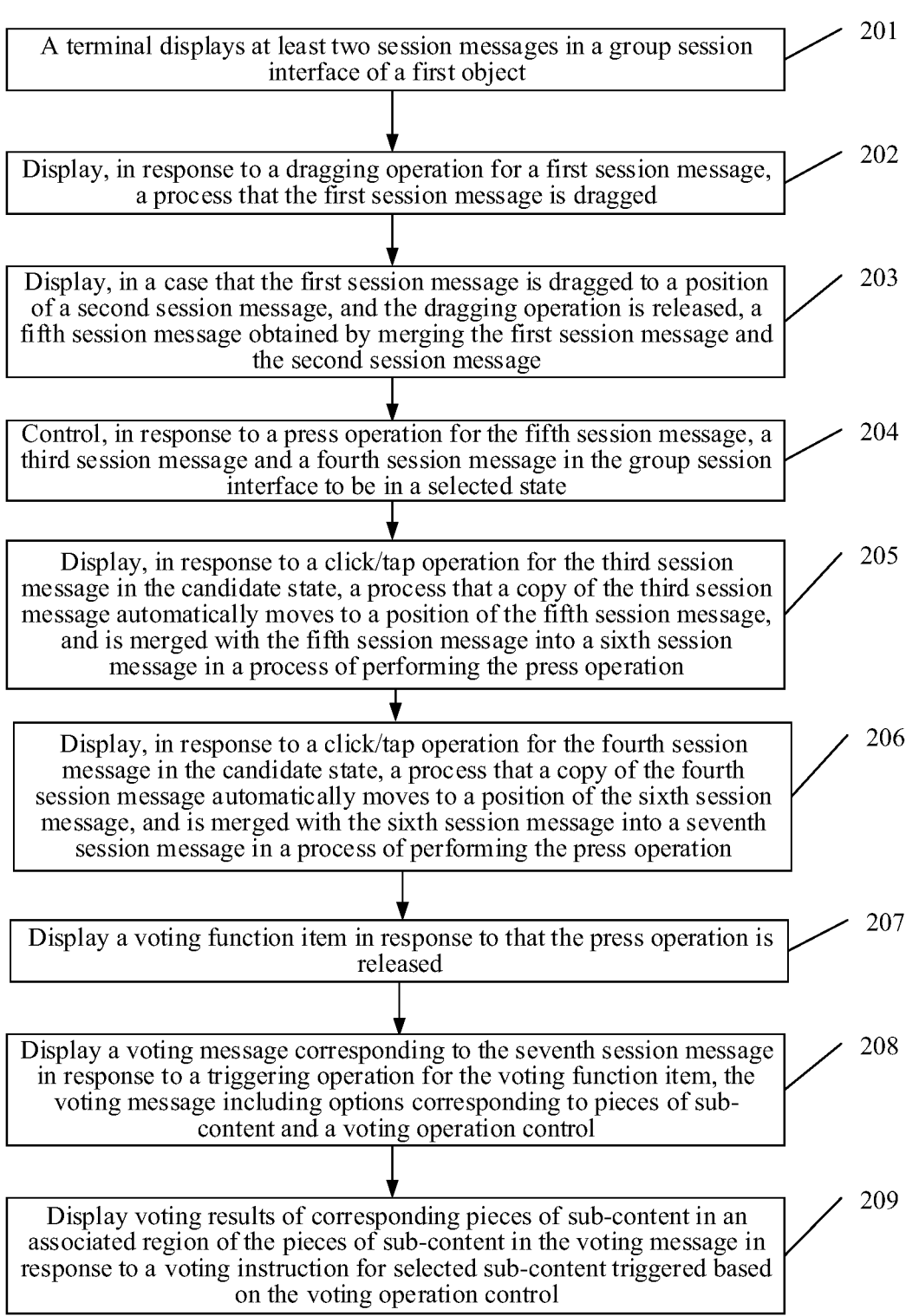
FIG. 15 is a schematic flowchart of a method for processing a session message according to some embodiments.

FIG. 15 is a schematic flowchart of a method for processing a session message according to some embodiments. In some embodiments, the method for processing a session message may be implemented by a terminal alone, or may be implemented by a server alone, or may be implemented by the server and the terminal in cooperation. An example in which the method is implemented by the terminal is used. Referring to FIG. 15, the method for processing a session message provided some embodiments includes the following operations:

Operation 201: The terminal displays at least two session messages in a group session interface of a first object.

The group session interface is an interface corresponding to a group session. The group may include a first object, a second object, and a third object. The at least two session messages displayed in the group session interface may include: a first session message and a second session message transmitted by the first object, a third session message transmitted by the second object, and a fourth session message transmitted by the third object.

Operation 202: Display, in response to a dragging operation for the first session message, a process that the first session message is dragged.

In some embodiments, only in a case that duration of the dragging operation for the first session message reaches target duration (the target duration may be set according to an actual requirement, for example, 10s), the process that the first session message is dragged is displayed.

Operation 203: Displaying, in a case that the first session message is dragged to a position of the second session message, a fifth session message obtained by merging the first session message and the second session message, and the dragging operation is released.

Operation 204: Control, in response to a press operation for the fifth session message, the third session message and the fourth session message in the group session interface to be in a candidate state.

Operation 205: Display, in response to a click/tap operation for the third session message in the candidate state, a process that a copy of the third session message automatically moves to a position of the fifth session message, and is merged with the fifth session message into a sixth session message in a process of performing the press operation.

Operation 206: Display, in response to a click/tap operation for the fourth session message in the candidate state, a process that a copy of the fourth session message automatically moves to a position of the sixth session message, and is merged with the sixth session message into a seventh session message in a process of moving the press operation.

Operation 207: Display a voting function item in response to that the press operation is released.

The voting function item is configured for voting for pieces of sub-content (that is, content of the first session message, content of the second session message, content of the third session message, and content of the fourth session message) included in the seventh session message.

Operation 208: Display a voting message corresponding to the seventh session message in response to a triggering operation for the voting function item, the voting message including options corresponding to the pieces of sub-content and a voting operation control.

Operation 209: Display a voting result of corresponding pieces of sub-content in an associated region of the pieces of sub-content in the voting message in response to a vote instruction for selected sub-content triggered based on the voting operation control.

According to some embodiments, the user can merge messages transmitted by the user by dragging the session messages, and can merge the session message transmitted by the user and the session messages transmitted by a plurality of group members by pressing one session message and clicking/tapping other session messages. In this way, omission of interrupted messages is avoided by merging the messages transmitted by the user, the communication efficiency of the messages is improved, and the messages of different session objects can be summarized by merging the session messages of the user and another person. For the messages obtained through summarization, a vote function is provided, so that the user votes for each piece of sub-content in the merged message, and correspondingly, the voting result is displayed. This improves processing efficiency of the target object for a plurality of session messages, and compared with a message is presented in a session interface only according to a transmitting time of the message in the related art, improves utilization of hardware processing resources and display resources of the electronic device.

In some embodiments the method is implemented by the server and the terminal in cooperation, and the instant messaging client is installed in the terminal is used for description in some embodiments. In some embodiments, the user may trigger the message merging instruction by dragging a message to a position of another session message in the session interface, to merge two messages into one message. Based on this, message processing in the client and on a server side in message merging is described.

In a session message processing system, each session message has concepts of seq (an order or a sequence) and a timestamp, and the user transmitting a session message based on the client goes through a back-end server. The seq[th] message in a current session, when transmitted, returns the seq to the client, and at the same time, data is assembled and transmitted to a receiving end with the seq, which may be used as a unique identifier of the message, and the client may locate the message according to the seq. The timestamp is a timestamp indicating message transmitting, and is also based on a timestamp of the back-end server instead of depending on the client. Similar to the seq, the timestamp is also returned to a sender when transmitted, and data is assembled and transmitted to a receiver with the timestamp.

Figure 16:
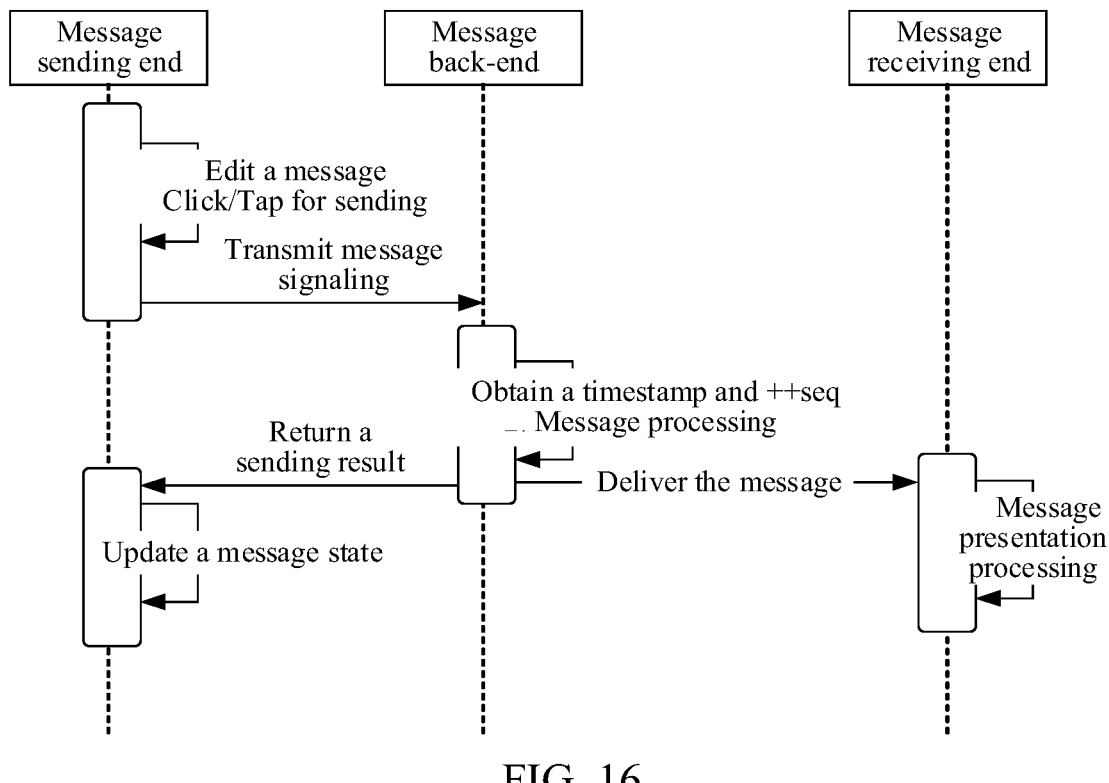
FIG. 16 is a schematic diagram of a procedure of transmitting a session message according to some embodiments.

FIG. 16 is a schematic diagram of a procedure of transmitting a session message according to some embodiments. Referring to FIG. 16, on a message transmitting end, after a message is edited, the user may click/tap a transmitting button to transmit the message, the message transmitting end transmits message signaling to a message back-end (that is, the server), and the server obtains a timestamp and a sequence of the message based on the message signaling, processes the message, distributes the message to each terminal of a session, that is, returning a transmitting result to the message transmitting end, so that the message transmitting end updates a message state, and delivers the message to the receiving end, so that the receiving end presents the message.

Figure 17:
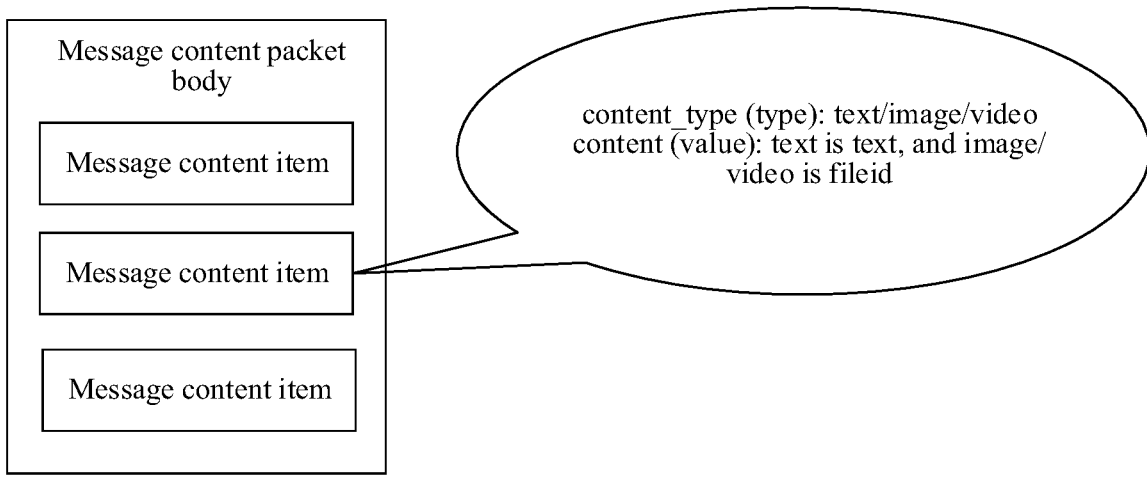
FIG. 17 is a schematic composition diagram of a message according to some embodiments.

Assembly of the message is described herein. The client sorts a list according to the timestamp, and performs assembly to obtain a specific session message according to the seq. FIG. 17 is a schematic composition diagram of a message according to some embodiments. Referring to FIG. 17, each message has fields of seq and timestamp, where content is an array representation, for presenting a message, a merged message, a mixed rich text message, and the like, and can accommodate text, a picture, a video, and the like. The text, the picture, and the video are all independent message content item representation.

Figure 20:
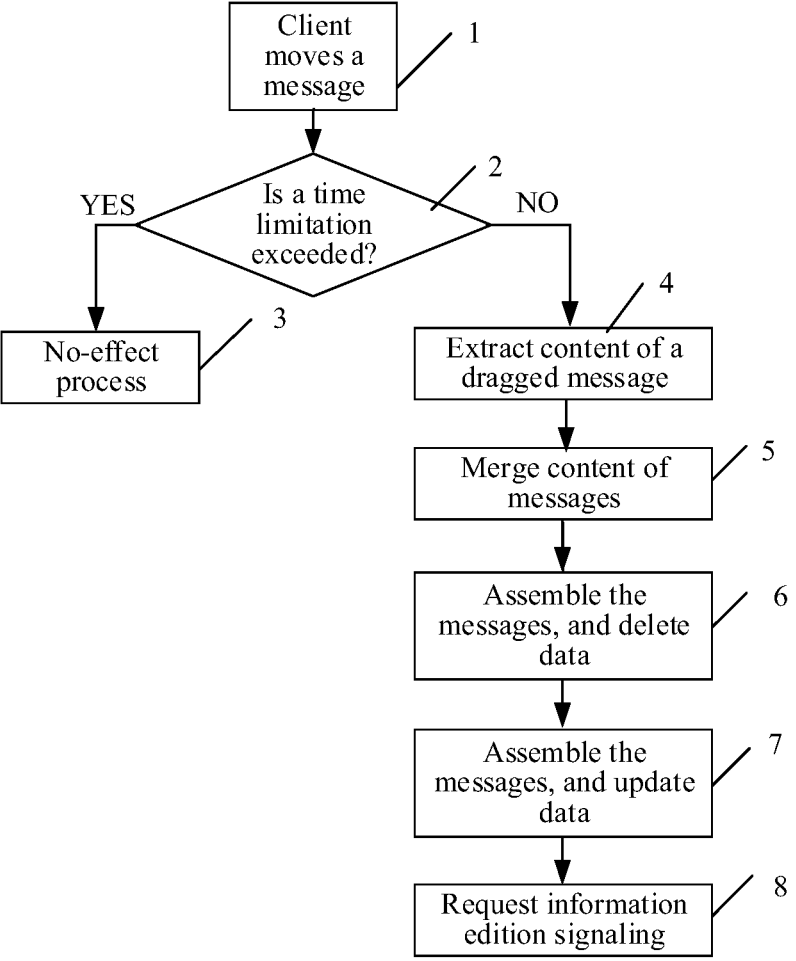
FIG. 20 is a schematic flowchart of preprocessing of merging messages according to some embodiments.

In some embodiments, the client transmits a protocol request packet to the server to implement edition processing such as modification and deletion of the message. FIG. 18 is a schematic composition diagram of a protocol request packet according to some embodiments. Referring to FIG. 18, the protocol request packet includes a request packet header data and a message edition packet array. The message edition packet array may include at least two message edition packets, an edition type (such as update or deletion) of each message edition packet, and basic information of a message (such as a sequence, a timestamp, and specific content of a message). Correspondingly, for a message edition signaling protocol request packet transmitted by the client, the server returns a response packet. FIG. 19 is a schematic composition diagram of a response packet according to some embodiments. Referring to FIG. 19, the response packet includes response packet header data and basic information about a result, and the basic information about a result may include request error code and request result description. A detailed protocol corresponding to the request packet and the response packet is defined as follows:

by the client. Referring to FIG. 20, a procedure of processing message merging is as follows:

Operation 1: The client moves a message.

The client triggers movement of a session message in response to a dragging operation of the user for the session message in a case that a dragging condition is met (for example, dragging duration reaches a duration threshold).

Operation 2: Determine whether a time limitation is exceeded.

In some embodiments, the user may only merge messages in a specific time range (for example, 1 minute). The client determines whether transmitting duration of the dragged message and a message to be merged (that is, when the user releases the dragging operation, a message reached by the dragged message) indicated by the user are in a set time range, and if the messages are not in the time range, operation 3 is performed, which is no-effect processing, and

```
option optimize_for=LITE RUNTIME;
//message edition
package tencent.im.message.modify;
enum MODIFY_TYPE//message edition type
{          MODIFY_TYPE_UNKNOW=1;
           MODIFY_TYPE_UPDATE=2; //update
           MODIFY-TYPE_DELETE=3; //deletion}
enum CONTENT_TYPE//message content type
{          CONTENT_TYPE_UNKNOW=1;
                     CONTENT_TYPE_TEXT=2; //text
                     CONTENT_TYPE_IMAGE=3; //picture
                     CONTENT_TYPE_AUDIO-4; //audio
                     CONTENT_TYPE_VIDEO=5; //video}
           message MessageContent//message definition
           {          optional CONTENT_TYPE content_type =1; //message content type
                      optional string content=2; //message content (the type being text
means the type is text, image/video is a file id)
                      ...
           {
           message MessageBody//basic information about each message
           {          optional uint64 seq=1; //seq value of a message
                      optional uint64 timestamp=2; //timestamp of a message (at a
millisecond level)
                      repeated MessageContent content=1; //information about the message
content}
           message MessageModify//modifying an information packet body
           {
                      optional MODIFY_TYPE modify_type =1; //edition type
                      optional MessageBody message_body=2; //information about a to-
be-edited message
           }
           message PkgReq//request packet
                      repeated MessageModify message_modify=1;
           }
           message PkgRsp//response
           {
                      optional uint32 ret=1; //request result
                      optional string err_msg=2; //information about the request result
           }
```

In some embodiments, in a case that the user triggers the message merging instruction to instruct performing session message merging, the message merging may involve two following modifications:

1. deletion of a merged message; and 2. modification of content of the merged message.

There are two pieces of edition information in a message edition protocol request body, including deletion and modification, where a merged message body is deleted, and a modified message body is also updated, and the deleted message body is added to the merged message body, thereby updating the message. FIG. 20 is a schematic flowchart of preprocessing of performing message merging according to some embodiments, where the preprocessing is performed the dragged message is restored; or if the messages are in the time range, operation 4 is performed.

Operation 3: Perform no-effect processing.

Operation 4: Extract content of the dragged message.

Operation 5: Merge content of the messages.

Operation 6: Assemble the messages, and delete data.

The client reassembles the messages based on the content of the merged messages, and deletes original data of the dragged message.

Operation 7: Assemble the messages, and update data.

Data is updated based on the reassembled message.

Operation 8: Request information edition signaling.

The client generates request message edition signaling based on the updated data, to transmit the request message edition signaling to the server.

Figure 21:
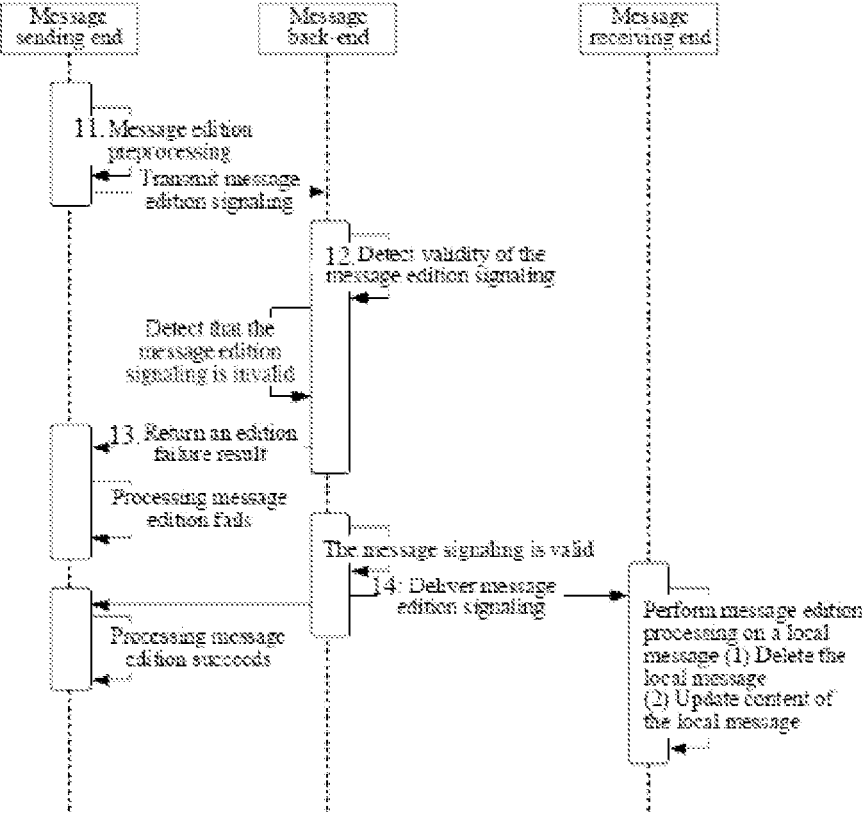
FIG. 21 is a schematic flowchart of interaction between a client and a server according to some embodiments.

In some embodiments, after generating the request message edition signaling, the client pushes message edition information to the receiver of the message through bridge connection of the server, so that the client of the message receiver updates a local message according to corresponding edition information. FIG. 21 is a schematic flowchart of interaction between a client and a server according to some embodiments. Referring to FIG. 21, interaction logic between a transmitting end of the client, the back-end server, and a receiving end of the client is as follows:

Operation 11: The client performs message edition preprocessing.

The message edition preprocessing of the client is specifically as shown in FIG. 20. After performing the message edition preprocessing, the client transmits the message edition signaling to a message back-end (that is, the server).

Operation 12: The message back-end detects validity of the message edition signaling.

The detection of the validity may be detection of whether a format of the message edition signaling is correct, whether there is illegal content, whether the user has corresponding operation permissions, and the like. In a case that the message back-end detects that the message edition signaling is invalid, operation 13 is triggered, and in a case that the message back-end detects that the message edition signaling is valid, operation 14 is triggered.

Operation 13: Return an edition failure result to the message transmitting end.

In a case that the message transmitting end receives the edition failure result transmitted by the message back-end, processing message edition fails, for example, prompt information of merging failure is displayed.

Operation 14: Deliver the message edition signaling to the message transmitting end and the message receiving end.

When receiving the message edition signaling transmitted by the message back-end, the message transmitting end may display a result after edition is successful. When receiving the message edition signaling transmitted by the message back-end, the message receiving end may edit a local message, such as deleting the local message and updating content of the local message.

During practical implementation, the sender and the receiver of the client process local data according to data of the message edition signaling, and may update/delete a specific message according to the seq. In each message session, the seq is the unique identifier of the message. If the message is to be updated, content of a message whose modify_type is MODIFY_TYPE_UPDATE in the message edition signaling is used for replacement. If the message is to be deleted (a value of modify_type is MODIFY-_TYPE_UPDATE), a message of a corresponding seq is deleted.

Figure 22:
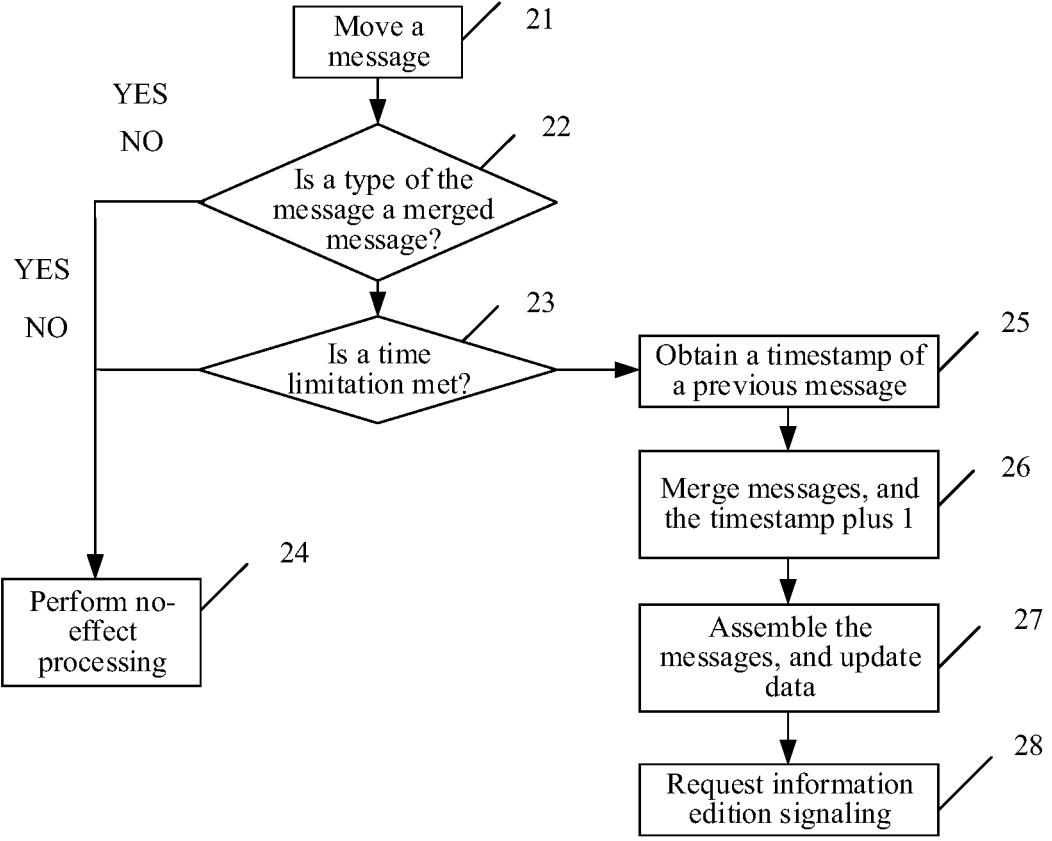
FIG. 22 is a schematic flowchart of preprocessing of adjusting a position of a merged message according to some embodiments.

During practical implementation, after a third session message is obtained by merging a first session message and a second session message in a session interface, the client may adjust a position of the third session message. A message in a session uses the seq as the unique identifier, the timestamp is a timestamp configured to identify the message, and is configured as a sorting sequence of the message when the message is presented. After obtaining the message, the client can insert the message into a specific position according to the timestamp of the message. A meaning of the timestamp is a number of seconds elapsed since Jan. 1, 1970, and the timestamp returned on the server is used uniformly to achieve uniformity of timestamps. FIG. 22 is a schematic flowchart of preprocessing of adjusting a position of a merged message (for example, the third session message)

according to some embodiments. Referring to FIG. 22, logic of the preprocessing of moving merged message is as follows:

Operation 21: The client moves a message.

In a case that the user triggers an adjustment operation for a position of the message, such as a dragging operation, an instruction of message movement is triggered. The instruction of message movement may be configured to instruct moving the message by removing, dragging, or the like, to implement adjustment for the position of the message.

Operation 22: Determine whether a type of the message is a merged message.

The client determines whether the message that the user indicates for adjustment is the merged message (for example, the third session message), if the message is the merged message, operation 23 is performed, or if the message is not the merged message, operation 24 is performed.

Operation 23: Determine whether a time limitation is met.

The client determines whether a time difference of positions of moved messages is in the time range, if the time difference is in the time range, step 25 is performed; or if the time difference is not in the time range, step 24 is performed.

Operation 24: A processing result is invalid.

The client controls the dragged message to be restored, and may indicate that the movement of the message is invalid, that is, displaying invalid movement indication information.

Operation 25: Obtain a timestamp of a previous message.

Operation 26: Merge the messages, and the timestamp plus 1.

Operation 27: Assemble the messages, and update data.

Operation 28: Request information edition signaling.

The client generates request message edition signaling based on the updated data, to transmit the request message edition signaling to the server.

In conclusion, for moving and merging messages, and preprocessing the movement of the position of the message, two aspects are mainly determined: whether the type of the message is a merged message, and whether a time difference of positions of moved messages is in the time range. The message is updated through the message edition signaling only when the condition is met. The timestamp of the message is mainly updated, and the timestamp of the previous message of a target position plus 1 according to the position of the moved message, so that the message is moved to a specific position when the client sorts messages and presents a message list. After the moved message is preprocessed, the client may request for the message edition signaling, and delivers the message edition signaling through the back-end server to the receiving end of the client. A type of modify_type is MODIFY_TYPE_UP-DATE.

Figure 23:
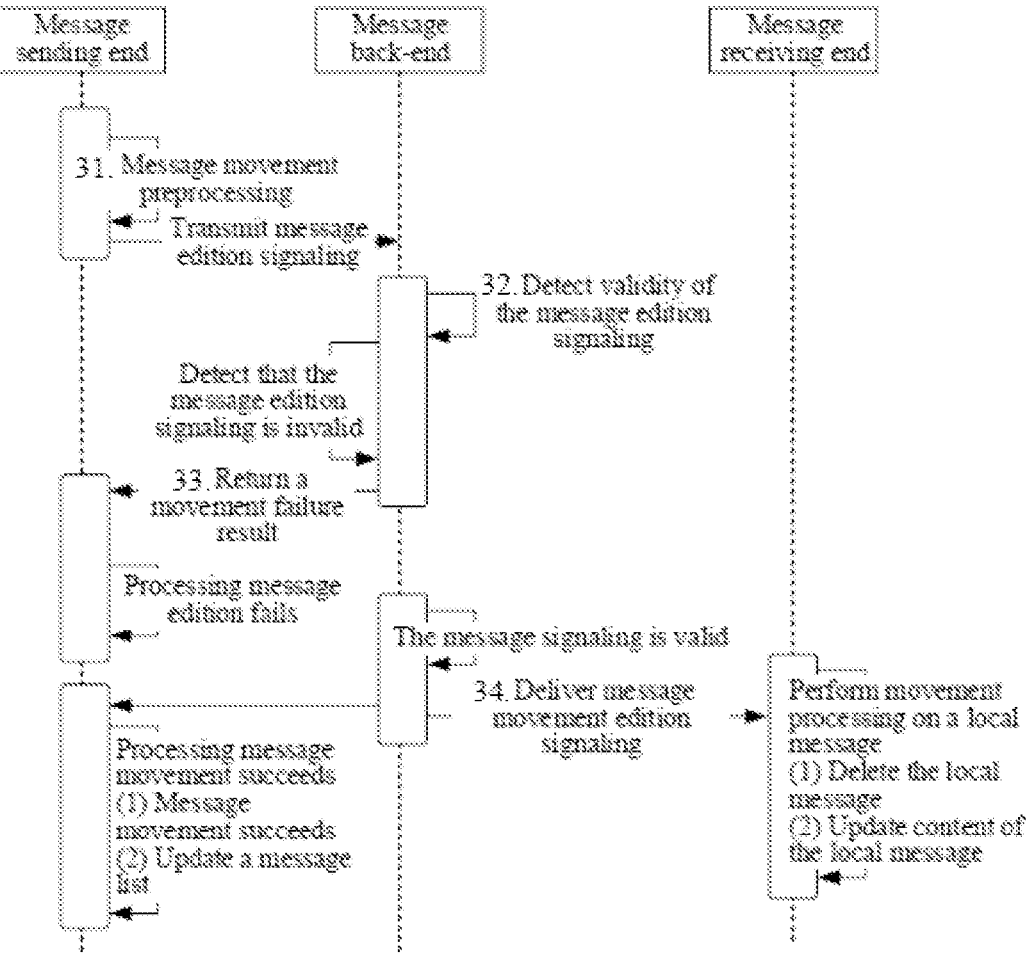
FIG. 23 is a schematic flowchart of interaction in a process of moving a merged message according to some embodiments.

FIG. 23 is a schematic flowchart of interaction in a process of moving a merged message according to some embodiments. Referring to FIG. 23.

Operation 31: The client performs message edition preprocessing.

The message edition preprocessing of the client is specifically as shown in FIG. 22. After performing the message edition preprocessing, the client transmits the message edition signaling to a message back-end (that is, the server).

Operation 32: The message back-end detects validity of the message edition signaling.

The detection of the validity may be detection of whether a format of the message edition signaling is correct, whether there is illegal content, whether the user has corresponding operation permissions, and the like. In a case that the message back-end detects that the message edition signaling is invalid, operation 33 is triggered, and in a case that the message back-end detects that the message edition signaling is valid, operation 34 is triggered.

Operation 33: Return an edition failure result to the message transmitting end.

In a case that the message transmitting end receives the edition failure result transmitted by the message back-end, processing message edition fails, for example, prompt information of movement failure is displayed.

Operation 34: The message back-end delivers message movement edition signaling to the message transmitting end and the message receiving end.

After receiving the message movement edition signaling, the transmitting end may display that message movement is successful, and update the message list. After receiving the message movement edition signaling, the receiving end may move and process the local message, such as deleting a moved local message, and updating the content of the local message.

In some embodiments, based on the foregoing embodiment, the user may not only merge the session message transmitted by the user, but also merge messages of the user and another person. The message of another person is merged with the message of the user, and the message of another person are not affected. A difference from merging a plurality of messages transmitted by the user in 1 minute lies in that the message of another person is only merged into the message of the user, but is not deleted. Content of deletion is not in the request message edition signaling, and there is only a situation of update. FIG. 24 is a schematic diagram of message signaling comparison according to some embodiments. Referring to FIG. 24, in signaling of merging the message of the user, there is deletion and update of the message content. However, in signaling of merging the messages of another person and the user, only update of the message content is included.

Merging the message of another person involves two-hand operation in interaction. The user needs to press the message of the user first, and click/tap the message of another person with the other hand. A program automatically merges the message content of the another person into the message content of the user. When the user releases the message of the user, update in message edition is performed, and a current message is updated to currently set message content. FIG. 25 is a schematic flowchart of preprocessing of merging messages of another person according to some embodiments. Referring to FIG. 25, logic of merging the message of another person is as follows:

Operation 41: The user presses the message of the user.

Operation 42: The client determines whether the message is released.

The client detects whether the message pressed by the user is released in real time. If the client detects the message is released, the client assembles the message and updates data, and generates the request message edition signaling to the server. If the client detects the message is not released, operation 43 is performed.

Operation 43: The user clicks/taps the message of another person.

Operation 44: The client determines whether a time limitation is exceeded.

The client determines whether transmitting duration of the message clicked/tapped by the user exceeds the time limitation according to a timestamp of the message. If the transmitting duration exceeds the time limitation, an operation of no-effect processing is performed. If the transmitting duration does not exceed the time limitation, content of the clicked/tapped message is extracted, and message content is merged.

After the preprocessing of the merging messages of another person, message edition signaling may be requested for. Only update is in signaling content, which updates the current message of the user, and the message data is updated through the receiver of the message by using the signaling. The requested signaling refers to FIG. 20 and the corresponding description. The same mechanism and the same type of signaling are used in the procedure, a difference only lies in assembly of signaling data, and there is not a case of deletion.

After the message is merged, is_combine is in the message content, configured for indicating whether the message is a merged message, true represents a merged message, and false represents a common message. When merging, an operation selection frame may pop up by right-click. Selection for operation includes transmitting, forwarding, copying, voting, and the like. At least the four capabilities are provided, where the transmitting, the forwarding, and the copying reuse capabilities of a current instant messaging client, and for voting, the message needs to be processed to be adapt to a vote interface. The message content is in a form of an array. Each item of the array is used as an option of the vote. FIG. 26 is a schematic structural diagram of message content according to some embodiments. Referring to FIG. 26, Content of each message is a MessageBody, including some basic messages, such as the unique identifier seq of the message, is_combine configured for identifying whether the type of the message is a merged message, and the timestamp of the message. The specific content of the message is included in a MessageArray structure, which is an array, each item in the array is a MessageContent structure, the MessageConent has type configured for identifying a type of the specific content (text, a picture, an audio, a video, or the like), and there is also the specific content. If the type is text, there is specific content of the text, if the type is a picture, an audio, a video, corresponding content is fileid of a resource uploaded to the server. Fileid is a corresponding unique identifier returned when the resource is uploaded to the server, and the corresponding resource can be downloaded through the fileid.

FIG. 27 is a schematic flowchart of processing after messages are merged according to some embodiments. Referring to FIG. 27, a postprocessing procedure of the message includes the following operations: When the user clicks/taps the merged message (that is, the message of a merging type), the client pops up the operation selection frame. The operation selection frame includes a transmitting function item, a forwarding function item, a copying function item, and a voting function item. When the user clicks/taps "Send", it is triggered that the message is invoked to be transmitted. When the user clicks/taps "Forward", it is triggered that the message is invoked to be forwarded. When the user clicks/taps "Copy", it is triggered that the message is invoked to be copied. When the user clicks/taps "Vote", the client is triggered to parse the message content, and the message content is divided, that is, the message content is divided into options for the vote, and then the interface is invoked for the user to vote.

Some embodiments provide a manner of disrupting a time sequence and merging a plurality of messages for operation in chat. In the related art, messages are sorted in the time sequence, consecutive messages to be transmitted by the user may be interrupted by a message of another person sometimes; or in a scenario of discussion of a plurality of people in a group, the user needs to summarize messages of the discussion of the plurality of people, which is inconvenient. In some embodiments, the user may drag a plurality of messages of the user in a specific period of time for merging. After the messages are merged into one message, a sequence may also be randomly adjusted. In a discussion of a plurality of people, the user may also drag and merge messages of another person, generating summary and minutes after merging for operations such as copying, forwarding, and voting. Therefore, in chat, communication of the messages of the user is more continuous, and chat messages of another person are more easily to summarize, increasing information communication efficiency in chat.

In some embodiments, as shown in FIG. 3, a software module of the apparatus for processing a session message 455 stored in the memory 450 may include:

a first display module 4551, configured to display at least two session messages, the at least two session messages including a first session message and a second session message;

a receiving module 4552, configured to receive a message merging instruction, the message merging instruction being configured to instruct merging the first session message and the second session message; and a second display module 4553, configured to display, in response to the message merging instruction, a third session message obtained by merging the first session message and the second session message.

In some embodiments, the first display module is further configured to display, in response to a dragging operation for the first session message, in a case that operation duration of the dragging operation reaches a duration threshold, a process that the first session message is dragged; and the receiving module is further configured to receive, in a case that the first session message is dragged to a position of the second session message, the message merging instruction in response to that the dragging operation is released.

In some embodiments, the first display module is further configured to obtain a first time interval between a transmitting time of the first session message and a current time in a case that the operation duration of the dragging operation reaches the duration threshold; and display, in a case that the first time interval is less than or equal to a time interval threshold, the process that the first session message is dragged.

In some embodiments, the receiving module is further configured to obtain, in a case that the first session message is dragged to the position of the second session message, a second time interval between a transmitting time of the second session message and the current time in response to that the dragging operation is released; and receive the message merging instruction in a case that the second time interval is less than or equal to the time interval threshold.

In some embodiments, the receiving module is further configured to obtain, in a case that the first session message is dragged to the position of the second session message, a transmitting time interval between the first session message and the second session message in response to that the dragging operation is released; and trigger the message merging instruction in a case that the transmitting time interval is less than or equal to a transmitting time interval threshold.

In some embodiments, the first display module is further configured to display a message merging function item in the session interface; and the receiving module is further configured to control, in response to a triggering operation for the message merging function item, the at least two session messages to be in a candidate state; and receive the message merging instruction in response to a selection operation for the first session message and the second session message that are in the candidate state.

In some embodiments, the second display module is further configured to display a process that the first session message automatically moves to the position of the second session message, and display, in a case that the transmitting time of the first session message is earlier than the transmitting time of the second session message, the third session message obtained by merging the first session message and the second session message.

In some embodiments, the at least two session messages are displayed in the session interface, and the apparatus further includes:

a first position adjustment module, configured to move a position of the third session message in the session interface in response to an order adjustment instruction for the third session message, to change a message order of the third session message in the session interface.

In some embodiments, the receiving module is further configured to trigger, in response to a dragging operation for the third session message, the order adjustment instruction for the third session message in a case that operation duration of the dragging operation reaches a duration threshold; and the first position adjustment module is further configured to control, along with performing of the dragging operation, the third session message to synchronously move in the session interface, to change the message order of the third session message in the session interface.

In some embodiments, the second display module is further configured to display a target region in a process of moving the position of the third session message; and display movement prompt information in a case that the third session message is moved to an edge of the target region, the movement prompt information being configured to prompt to adjust an order of the third session message in the target region.

In some embodiments, the second display module is further configured to display an interception line between the third session message and the target historical session message in a process of moving the position of the third session message, in a case that the third session message is moved to a target position, the target position enabling the third session message to be adjacent to a target historical session message, and a transmitting time interval between the third session message and the target historical session message reaches a time interval threshold, the interception line being configured to intercept the third session message in a case that the third session message is moved to the interception line.

In some embodiments, the third session message includes first content corresponding to the first session message and second content corresponding to the second session message; and the apparatus further includes:

a second position adjustment module, configured to adjust a position of at least one of the first content and the second content in the third session message in response to a position adjustment instruction for content in the third session message, to change an order of the first content and the second content in the third session message.

In some embodiments, the first display module is further configured to display at least two session messages in a session interface of a target object; and in a case that a transmitting object of the first session message is the target object, and a transmitting object of the second session message is a session object of the target object, the second display module is further configured to display a message copy of the second session message; and display, in the session interface, the third session message obtained by merging the first session message and the message copy of the second session message.

In some embodiments, the first display module is further configured to display at least two session messages in a session interface of a target object; and in a case that at least one of the transmitting objects of the first session message and the second session message is the session object of the target object, the first display module is further configured to display authorization prompt information and a corresponding determining function item, the authorization prompt information being configured to prompt to obtain authorization for performing a merging operation on a session message of the session object; and transmit an authorization request to the session object in response to a triggering operation for the determining function item, the authorization request being configured to request authorization for performing the merging operation on the session message of the session object; and the second display module is further configured to display the third session message obtained by merging the first session message and the second session message in the session interface in a case that the authorization for performing the merging operation on the session message of the session object is obtained.

In some embodiments, the first display module is further configured to display at least two session messages in a session interface of a target object; and in a case that a transmitting object of the first session message is the target object, and a transmitting object of the second session message is a session object of the target object, the second display module is further configured to control, in response to a press operation for the first session message, the first session message to be in a selected state;

display a copy of the second session message in response to a dragging operation for the second session message in a process of performing the press operation, and display a process that the copy of the second session message is dragged in the session interface; and the receiving module is further configured to receive, in a case that the second session message is dragged to a position of the first session message, the message merging instruction in response to that the dragging operation is released.

In some embodiments, the second display module is further configured to display a process that a fourth session message is dragged in the session interface in response to a dragging operation for the fourth session message in a process of performing the press operation; and display, in a case that the fourth session message is dragged to a position of the third session message, in response to that the dragging operation is released, a fifth session message obtained by merging the fourth session message and the third session message.

In some embodiments, the second display module is further configured to display a number of merged session messages in a process of performing the press operation.

In some embodiments, the first display module is further configured to display merging guide information in the session interface of the target object, the merging guide information being configured to guide the target object to perform a target operation, to trigger the message merging instruction.

In some embodiments, the apparatus further includes a message processing module;

the second display module is further configured to display at least one message processing function item corresponding to the third session message after displaying the third session message obtained by merging the first session message and the second session message; and the message processing module is configured to perform a target processing operation indicated by a target message processing function item on the third session message in response to a triggering operation for the target message processing function item in the at least one message processing function item.

In some embodiments, the third session message includes at least two pieces of sub-content; and the message processing module is further configured to display a voting message corresponding to the third session message in the session interface in a case that the target message processing function item is a voting function item, the voting message including: options corresponding to the pieces of sub-content and a voting operation control, the voting operation control being configured for voting for sub-content selected based on the option.

In some embodiments, the message processing module is further configured to display a voting result of the corresponding sub-content in an associated region of each sub-content in the voting message, the voting result being configured to indicate a number of session objects that vote for the corresponding sub-content.

In some embodiments, the message processing module is further configured to cancel display of the voting operation control after displaying the voting message corresponding to the third session message in a case that display duration of the voting message reaches a display duration threshold, and display end indication information indicating that the vote ends in the voting message.

In some embodiments, the message processing module is further configured to display a forwarding object selection interface in a case that the target message processing function item is a forwarding function item;

display at least one forwarding object for selection in the forwarding object selection interface, the forwarding object and the target object being in a social correlation relationship; and transmit the third session message to a target forwarding object in response to a selection instruction for the target forwarding object in the at least one forwarding object.

In some embodiments, the message processing module is further configured to generate, in a case that the target message processing function item is the meeting minutes function item, meeting minutes corresponding to the third session message in response to a triggering operation for the meeting minutes function item; and store the meeting minutes in response to a storage instruction for the meeting minutes.

In some embodiments, the third session message includes at least two pieces of sub-content; and the message processing module is further configured to semantically analyze content of the third session message, and generate a title of the meeting minutes based on an analysis result;

obtain a transmitting time corresponding to each piece of sub-content, and determine the minute time of the meeting minutes based on the obtained transmitting time; and generate the meeting minutes including the title and the minute time by using the content of the third session message as a body of the meeting minutes.

In some embodiments, the second display module is further configured to display a seventh session message obtained by merging the third session message and a sixth session message in the session interface in response to a message merging instruction for the third session message and the sixth session message after displaying the third session message obtained by merging the first session message and the second session message in the session interface.

Some embodiments provide an electronic device, including:

a memory, configured to store executable instructions; and a processor, configured to implement, when executing the executable instructions stored in the memory, the method for processing a session message according to some embodiments.

Some embodiments provide a computer program product or a computer program. The computer program product or the computer program includes a computer-executable instruction, the computer-executable instructions being stored in a computer-readable storage medium. A processor of a computer device reads the computer instruction from the computer-readable storage medium, and executes the computer instruction, to cause the computer device to perform the method for processing a session message provided in some embodiments.

Some embodiments provide a computer-readable storage medium having executable instructions stored therein, the executable instruction, when executed by a processor, implementing the method for processing a session message according to some embodiments.

Some embodiment provide a computer program product, including a computer program or instructions, the computer program or the instructions, when executed by a processor, implementing the method for processing a session message according to some embodiments.

In some embodiments, the computer-readable storage medium may be a storage such as a read-only memory (ROM), a random access memory (RAM), an erasable programmable read-only memory (EPROM), an electrically erasable programmable read-only memory (EEPROM), a flash memory, a magnetic surface storage, an optic disc, or a CD-ROM; or may be any device including one of or any combination of the foregoing memories.

In some embodiments, the executable instruction may be written in any form of programming language (including a compiled or interpreted language, or a declarative or procedural language) by using a form of a program, software, a software module, a script or code, and may be deployed in any form, including being deployed as an independent program or being deployed as a module, a component, a subroutine, or another unit suitable for use in a computing environment.

In some embodiments, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or modules, subprograms, or code parts).

In some embodiments, the executable instruction may be deployed to be executed on a computing device, or deployed to be executed on a plurality of computing devices at the same location, or deployed to be executed on a plurality of computing devices that are distributed in a plurality of locations and interconnected by using a communication network.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A session message processing method, performed by an electronic device, comprising:

displaying at least two session messages, the at least two session messages comprising a first session message and a second session message;

receiving a message merging instruction, the message merging instruction being configured to instruct merging the first session message and the second session message;

determining, after receiving the message merging instruction, whether a merging condition is satisfied based on a first time interval between a transmitting time of the first session message and a current time of a dragging operation meeting a message movement condition; and displaying, based on the message merging instruction and determination that the merging condition is satisfied, a third session message obtained by merging the first session message and the second session message.

2. The session message processing method according to claim 1, wherein receiving comprises:

displaying, based on the dragging operation for the first session message meeting the message movement condition, a process that the first session message is dragged; and receiving, based on the first session message being dragged to a position of the second session message, the message merging instruction when the dragging operation is released.

3. The session message processing method according to claim 2, wherein displaying, based on the dragging operation meeting the message movement condition, the process that the first session message is dragged comprises:

obtaining the first time interval between a transmitting time of the first session message and a current time based on the dragging operation meeting the message movement condition; and displaying, based on the first time interval being less than or equal to a time interval threshold as the merging condition, the process that the first session message is dragged.

4. The session message processing method according to claim 2, wherein receiving, based on the first session message being dragged to the position of the second session message, the message merging instruction based on the dragging operation being released comprises:

obtaining, based on the first session message being dragged to the position of the second session message, a transmitting time interval between the first session message and the second session message based on the dragging operation being released; and receiving the message merging instruction based on the transmitting time interval being less than or equal to a transmitting time interval threshold.

5. The session message processing method according to claim 1, further comprising:

displaying a message merging function item;

controlling, based on a triggering operation for the message merging function item, the at least two session messages to be in a candidate state; and triggering the message merging instruction based on a selection operation for the first session message and the second session message that are in the candidate state.

6. The session message processing method according to claim 5, wherein displaying the third session message obtained by merging the first session message and the second session message comprises:

displaying, based on a transmitting time of the first session message being earlier than a transmitting time of the second session message, a process that the first session message automatically moves to a position of the second session message, and displaying the third session message obtained by merging the first session message and the second session message.

7. The session message processing method according to claim 1, wherein displaying the at least two session messages comprises:

displaying the at least two session messages in a session interface; and wherein after displaying the third session message obtained by merging the first session message and the second session message, the session message processing method further comprises:

moving a position of the third session message in the session interface based on an order adjustment instruction for the third session message to change a message order of the third session message in the at least two session messages.

8. The session message processing method according to claim 7, further comprising:

triggering, based on a dragging operation for the third session message, the order adjustment instruction for the third session message based on an operation duration of the dragging operation reaching a duration threshold, wherein the moving comprises:

controlling, along with performing of the dragging operation, the third session message to synchronously move in the session interface to change the message order of the third session message in the at least two session messages.

9. The session message processing method according to claim 7, further comprising:

displaying a target region in a process of moving the position of the third session message; and displaying movement prompt information based on the third session message being moved to an edge of the target region, the movement prompt information being configured to prompt to adjust an order of the third session message in the target region.

10. The session message processing method according to claim 7, further comprising:

in a process of moving the position of the third session message, based on the third session message being moved to a target position, the target position enabling the third session message to be adjacent to a target historical session message, and a transmitting time interval between the third session message and the target historical session message reaching a time interval threshold, displaying an interception line between the third session message and the target historical session message, the interception line being configured to intercept the third session message based on the third session message being moved to the interception line.

11. The session message processing method according to claim 1, wherein the third session message comprises first content corresponding to the first session message and second content corresponding to the second session message; and wherein after displaying the third session message obtained by merging the first session message and the second session message in the session interface, the session message processing method further comprises:

adjusting a position of at least one of the first content and the second content in the third session message based on a position adjustment instruction for content in the third session message to change an order between the first content and the second content in the third session message.

12. The session message processing method according to claim 1, wherein displaying the at least two session messages comprises:

displaying the at least two session messages in a session interface of a target object; and based on a transmitting object of the first session message being the target object, and a transmitting object of the second session message being a session object of the target object, displaying the third session message obtained by merging the first session message and the second session message comprises:

displaying a message copy of the second session message; and displaying, in the session interface, the third session message obtained by merging the first session message and the message copy of the second session message.

13. The session message processing method according to claim 1, wherein displaying the at least two session messages comprises: displaying the at least two session messages in a session interface of a target object;

wherein based on a transmitting object of at least one of the first session message and the second session message is a session object of the target object, before displaying the third session message obtained by merging the first session message and the second session message, the session message processing method further comprises:

displaying authorization prompt information and a corresponding determining function item, the authorization prompt information being configured to prompt to obtain authorization for performing a merging operation on a session message of the session object; and transmitting an authorization request to the session object based on a triggering operation for the determining function item, the authorization request being configured to request authorization for performing the merging operation on the session message of the session object; and wherein displaying the third session message obtained by merging the first session message and the second session message comprises:

displaying the third session message obtained by merging the first session message and the second session message in the session interface based on the authorization for performing the merging operation on the session message of the session object being obtained.

14. The session message processing method according to claim 1, wherein displaying the at least two session messages comprises: displaying the at least two session messages in a session interface of a target object; and wherein based on a transmitting object of the first session message being the target object, and a transmitting object of the second session message being a session object of the target object, the session message processing method further comprises:

controlling, based on a press operation for the first session message, the first session message to be in a selected state;

displaying a copy of the second session message based a dragging operation for the second session message in a process of performing the press operation, and displaying a process that the copy of the second session message is dragged in the session interface; and triggering, based on the second session message being dragged to a position of the first session message, the message merging instruction based on the dragging operation being released.

15. The session message processing method according to claim 14, wherein after displaying the third session message obtained by merging the first session message and the second session message, the session message processing method further comprises:

displaying, in the process of performing the press operation, based on a dragging operation for a fourth session message, a process that the fourth session message is dragged in the session interface; and displaying, based on the fourth session message being dragged to a position of the third session message, based on that the dragging operation being released, a fifth session message obtained by merging the fourth session message and the third session message.

16. The session message processing method according to claim 1, wherein displaying the at least two session messages comprises: displaying the at least two session messages in a session interface of a target object; and wherein based on a transmitting object of the first session message being the target object and a transmitting object of the second session message being a session object of the target object, receiving comprises:

based on a press operation for the first session message, controlling the session messages in the session interface to be in a candidate state based on the press operation meeting a press condition; and receiving the message merging instruction based on a triggering operation for the second session message in the candidate state in a process of performing the press operation.

17. The session message processing method according to claim 16, wherein after displaying the third session message obtained by merging the first session message and the second session message, the session message processing method further comprises:

displaying, in the process of performing the press operation, based on a triggering operation for the sixth session message, a process that a copy of a sixth session message automatically moves to the position of the third session message, and displaying a seventh session message obtained by merging the copy of the sixth session message and the third session message.

18. The session message processing method according to claim 1, wherein after displaying the third session message obtained by merging the first session message and the second session message, the session message processing method further comprises:

displaying at least one message processing function item corresponding to the third session message; and performing, based on a triggering operation for a target message processing function item in the at least one message processing function item, a target processing operation indicated by the target message processing function item on the third session message.

19. A session message processing apparatus, comprising:

at least one memory configured to store program code; and at least one processor configured to read the program code and operate as instructed by the program code, the program code comprising:

first display code configured to cause at least one of the at least one processor to display at least two session messages, the at least two session messages comprising a first session message and a second session message;

receiving code configured to cause at least one of the at least one processor to receive a message merging instruction, the message merging instruction being configured to instruct merging the first session message and the second session message;

determining code configured to cause the at least one of the least one processor to determined, after receiving the message merging instruction, whether a merging condition is satisfied based on a first time interval between a transmitting time of the first session message and a current time of a dragging operation meeting a message movement condition; and second display code configured to cause at least one of the at least one processor to display, based on the message merging instruction and determination that the merging condition is satisfied, a third session message obtained by merging the first session message and the second session message.

20. A non-transitory computer-readable storage medium storing computer code which, when executed by at least one processor, causes the at least one processor tot:

display at least two session messages, the at least two session messages comprising a first session message and a second session message;

receive a message merging instruction, the message merging instruction being configured to instruct merging the first session message and the second session message;

determining, after receiving the message merging instruction, whether a merging condition is satisfied based on a first time interval between a transmitting time of the first session message and a current time of a dragging operation meeting a message movement condition; and display, based on the message merging instruction and determination that the merging condition is satisfied, a third session message obtained by merging the first session message and the second session message.

*   *   *   *   *